US012473005B2

(12) United States Patent
Sun

(10) Patent No.: US 12,473,005 B2
(45) Date of Patent: Nov. 18, 2025

(54) STROLLER FRAME AND STROLLER

(71) Applicant: Wonderland Switzerland AG, Steinhausen (CH)

(72) Inventor: Mingxing Sun, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 757 days.

(21) Appl. No.: 17/768,225

(22) PCT Filed: Oct. 23, 2020

(86) PCT No.: PCT/EP2020/079894
§ 371 (c)(1),
(2) Date: Apr. 12, 2022

(87) PCT Pub. No.: WO2021/078994
PCT Pub. Date: Apr. 29, 2021

(65) Prior Publication Data
US 2023/0182800 A1 Jun. 15, 2023

(30) Foreign Application Priority Data
Oct. 25, 2019 (CN) .......................... 201911028073.0

(51) Int. Cl.
*B62B 7/10* (2006.01)
*B62B 7/06* (2006.01)
*B62B 9/08* (2006.01)

(52) U.S. Cl.
CPC ................ *B62B 7/10* (2013.01); *B62B 7/062* (2013.01); *B62B 7/066* (2013.01); *B62B 9/082* (2013.01);
(Continued)

(58) Field of Classification Search
CPC ........... B62B 7/10; B62B 7/062; B62B 7/066; B62B 7/083; B62B 9/082; B62B 9/087;
(Continued)

(56) References Cited

U.S. PATENT DOCUMENTS 3,084,949 A     4/1963   Forster
4,216,974 A * 8/1980   Kassai .................... B62B 7/062
                                                                        280/42
(Continued)

FOREIGN PATENT DOCUMENTS

CN     203111264 U * 8/2013
CN     104787104 A    7/2015
(Continued)

OTHER PUBLICATIONS

"International Search Report" mailed on Jan. 14, 2021 for International application No. PCT/EP2020/079894, International filing date:Oct. 23, 2020.

*Primary Examiner* — Steve Clemmons
(74) *Attorney, Agent, or Firm* — Volpe Koenig

(57) ABSTRACT

A stroller frame (100) includes a front leg (10), a bottom tube (30), a rear leg (20), an upper support member (40) and a lower support member (50). The front leg (10), the bottom tube (30), the lower support member (50) and the upper support member (40) are pivotally connected to each other to form a four-bar linkage structure. The rear leg (20) is connected to an end of the bottom tube (30). A lock mechanism (60) is disposed at a pivot joint between the upper support member (40) and the lower support member (50). The lock mechanism (60) is able to lock the upper support member (40) and the lower support member (50) at an expanded angle, such that the front leg (10) is able to be expanded with respect to the bottom tube (30). The lock mechanism (60) is unlocked to release the upper support (Continued)

member (40) and the lower support member (50), such that the front leg (10) is able to be folded with respect to the bottom tube (30).

26 Claims, 19 Drawing Sheets

(52) U.S. Cl.
CPC .......... *B62B 9/087* (2013.01); *B62B 2205/12* (2013.01); *B62B 2205/18* (2013.01); *B62B 2205/24* (2013.01); *B62B 2301/20* (2013.01)

(58) Field of Classification Search
CPC ... B62B 9/18; B62B 2205/12; B62B 2205/18; B62B 2205/24; B62B 2205/20; B62B 2301/20
See application file for complete search history.

(56) References Cited

U.S. PATENT DOCUMENTS

| | | | | |
|---|---|---|---|---|
| 6,416,077 | B1 * | 7/2002 | Chen | B62B 7/08 |
| | | | | 280/47.38 |
| 7,188,858 | B2 * | 3/2007 | Hartenstine | B62B 7/083 |
| | | | | 296/107.02 |
| 8,061,732 | B2 * | 11/2011 | Song | B62B 7/08 |
| | | | | 280/647 |
| 8,505,956 | B2 * | 8/2013 | Hartenstine | B62B 7/08 |
| | | | | 280/47.38 |
| 9,776,652 | B2 * | 10/2017 | Zhong | B62B 7/10 |
| 9,908,552 | B2 | 3/2018 | Fleming | |
| 10,843,719 | B2 * | 11/2020 | Lelaure | B62B 7/10 |
| 10,850,760 | B2 * | 12/2020 | Shapiro | B62B 7/083 |
| 11,358,623 | B2 * | 6/2022 | Zhong | B62B 7/14 |
| 2010/0013195 | A1 * | 1/2010 | Hsu | B62B 7/10 |
| | | | | 280/642 |
| 2012/0319382 | A1 * | 12/2012 | Lin | B62B 7/10 |
| | | | | 280/647 |

FOREIGN PATENT DOCUMENTS

| | | | | |
|---|---|---|---|---|
| CN | 205632631 U | | 10/2016 | |
| CN | 107364483 A | * | 11/2017 | ............... B62B 7/08 |
| CN | 108163039 A | * | 6/2018 | ............... B62B 9/00 |
| CN | 108297926 A | * | 7/2018 | ............. B62B 7/062 |
| CN | 207826322 U | | 9/2018 | |
| CN | 208119238 U | * | 11/2018 | |
| CN | 111409686 A | * | 7/2020 | ............. B62B 7/044 |
| DE | 202011002812 U1 | * | 5/2011 | ............. B62B 7/062 |
| GB | 2494755 A | * | 3/2013 | ............. B60B 3/001 |
| TW | M325259 | | 1/2008 | |
| WO | WO-2012002596 A1 | * | 1/2012 | ............... B62B 9/18 |

\* cited by examiner

STROLLER FRAME AND STROLLER

FIELD OF THE INVENTION

The present invention relates to a baby carriage, particularly a stroller frame and a stroller capable of preventing accidental folding.

BACKGROUND OF THE INVENTION

Baby carriages are widely used in families with infants and children. The diversified baby carriages provide great convenience for carrying infants and children, but at the same time, people have higher and higher requirements for the functionality and safety of baby carriages. Take the stroller as an example, which brings a lot of convenience to the outdoor activities of infants and children. At the same time, the stroller is designed into a foldable structure for convenient storage and carrying.

However, the folding manner of the frame of the conventional stroller is complicated, and the user often needs to fold the frame through more complicated operation, which brings inconvenience to the user. The expanded frame is easy to be folded accidently due to misoperation when being used and then an accident occurs. Furthermore, the folded stroller occupies a large area and is not easy to store.

Therefore, it is necessary to provide a stroller frame and a stroller to solve the aforesaid problems of the prior art.

SUMMARY OF THE INVENTION

The present invention aims at providing a stroller frame with high safety, small folding size and capable of effectively avoiding accident caused by accidental folding.

The present invention aims at providing a stroller with the aforesaid stroller frame.

This is achieved by a stroller frame according to claim 1 and a stroller according to claim 26. The dependent claims pertain to corresponding further developments and improvements.

As will be seen more clearly from the detailed description following below, the claimed stroller frame includes a front leg, a bottom tube, a rear leg, an upper support member and a lower support member. The front leg, the bottom tube, the lower support member and the upper support member are pivotally connected to each other to form a four-bar linkage structure. The rear leg is connected to an end of the bottom tube close to the lower support member. A lock mechanism is disposed at a pivot joint between the upper support member and the lower support member. The lock mechanism is able to lock the upper support member and the lower support member at an expanded angle, such that the front leg is able to be expanded with respect to the bottom tube. The lock mechanism is unlocked to release the upper support member and the lower support member, such that the front leg is able to be folded with respect to the bottom tube.

Compared to the prior art, the front leg, the bottom tube, the lower support member and the upper support member of the invention are pivotally connected to each other to form a four-bar linkage structure, and the lock mechanism is disposed at the pivot joint between the upper support member and the lower support member, such that the stroller frame can be flexibly folded through the four-bar linkage structure and the lock mechanism can be operated to lock or unlock the upper support member and the lower support member, so as to lock the expanded stroller frame. Accordingly, the invention can avoid accident caused by accidental folding of the stroller frame, and the folded stroller frame has a small size and is easy to carry.

Preferably, the lock mechanism includes an operating member, an engaging member and a fixing member engaging with the engaging member. The engaging member is movably disposed on the lower support member. The fixing member is disposed on the upper support member. The fixing member corresponds to and engages with the engaging member when the upper support member and the lower support member are situated at the expanded angle. The operating member is connected to the engaging member and controls the engaging member to be disengaged from the fixing member to unlock the lock mechanism.

Preferably, the fixing member is an engaging recess disposed on the upper support member and the engaging member includes an engaging block matching with the engaging recess.

Preferably, the lock mechanism further includes a first elastic member. The first elastic member is connected to the engaging member and provides an elastic force for the engaging member to engage with the fixing member.

Preferably, the engaging member is slidably connected to the lower support member and able to slide with respect to the lower support member to engage with or disengage from the fixing member.

Preferably, the lock mechanism further comprises a decorative cover and a first reinforcing member. The lower support member has a first sliding groove for the engaging member to slide therein. The decorative cover is disposed on the first sliding groove and covers the first sliding groove. The decorative cover encloses the engaging member in the first sliding groove. The first reinforcing member is disposed on the engaging member.

Preferably, the operating member comprises a first operating portion, a first transmitting portion connected to the first operating portion, and a sliding block. The first transmitting portion is disposed on the lower support member along a direction perpendicular to a moving direction of the engaging member and has a first inclined groove inclining with respect to the moving direction of the engaging member. The sliding block is slidably connected to the first inclined groove and disposed on the engaging member. The first operating portion is operated to drive the first transmitting portion to slide with respect to the lower support member, such that the sliding block slides along the first inclined groove to disengage the engaging member from the fixing member.

Preferably, the lock mechanism further comprises a second safety lock and the second safety lock selectively restrains an operation of the operating member.

Preferably, the second safety lock includes a second operating portion. The second operating portion is movably connected to the operating member or the lower support member. The second operating portion is operated to move to an unlock position and a lock position with respect to the operating member. The second operating portion engages with the operating member or the lower support member at the unlock position to restrain the operation of the operating member. The second operating portion disengages from the operating member or the lower support member at the lock position to unlock the operating member.

Preferably, the second safety lock further includes a second elastic member and the second elastic member provides an elastic force for the second operating portion to lock the operating member.

Preferably, a restraining member is disposed between the second operating portion and the operating member or the lower support member. The restraining member enables the second operating portion to move between the unlock position and the lock position with respect to the operating member.

Preferably, the rear leg includes a transverse tube. The transverse tube is connected to the bottom tube. The lower support member is pivotally connected to the transverse tube, such that that the lower support member is pivotally connected to the bottom tube through the transverse tube.

Preferably, the second operating portion is movably connected to the lower support member. The second safety lock further includes a lower operating member, a third elastic member and a second transmitting portion. The lower operating member is movably connected to the transverse tube. The second transmitting portion is connected between the lower operating member and the second operating portion. The lower operating member is operated to drive the second operating portion to unlock the operating member through the second transmitting portion. The third elastic member provides an elastic force for the lower operating member to lock the operating member.

Preferably, the lower operating member is rotatably connected to the transverse tube and the second transmitting portion is a wire.

Preferably, the second operating portion is slidably connected to the lower support member.

Preferably, the second operating portion is disposed at an upper side, a lower side, a left side or a right side of the operating member.

Preferably, the stroller frame further includes a linkage mechanism. The front leg includes a front leg rod and a front wheel member. The front wheel member is rotatably connected to the front leg rod to form a first pivot point. The front leg rod is pivotally connected to the bottom tube to form a second pivot point. The linkage mechanism is disposed between the first pivot point and the second pivot point, such that the linkage mechanism drives the front wheel member to be folded with respect to the front leg rod when the front leg rod is folded with respect to the bottom tube.

Preferably, the linkage mechanism includes a first gear plate disposed on the front leg rod, a second gear plate disposed on the front wheel member, and a synchromesh gear disposed on the bottom tube. The synchromesh gear meshes with teeth of the first gear plate and teeth of the second gear plate synchronously.

Preferably, the linkage mechanism includes a first gear plate disposed on the bottom tube, a second gear plate disposed on the front wheel member, and a synchromesh gear disposed on the front leg rod. The synchromesh gear meshes with teeth of the first gear plate and teeth of the second gear plate synchronously.

Preferably, the stroller frame further includes a brake mechanism. The rear leg includes a transverse tube and a rear wheel. Opposite ends of the transverse tube are equipped with the rear wheel. The brake mechanism is disposed on the transverse tube. The brake mechanism is operated to brake the rear wheel.

Preferably, the brake mechanism includes a brake pedal and a brake pin. A circumference of the rear wheel has a plurality of brake holes for receiving the brake pin. The brake pedal is movably disposed on the transverse tube and able to drive the brake pin to be inserted into one of the brake holes to brake the rear wheel.

Preferably, the brake mechanism further includes a fourth elastic member and the fourth elastic member provides an elastic force for ejecting the brake pin out of the brake hole.

Preferably, the brake mechanism further includes a driving member sleeved on the transverse tube and able to rotate around an axle center of the transverse tube. The brake pedal is movably disposed on the transverse tube and drives the driving member to rotate. A side of the driving member has an inclined wall opposite to the brake pin. The inclined wall is inclined along a rotating direction of the driving member. The brake pin is slidably connected to the transverse tube and abuts against the inclined wall.

Preferably, the stroller frame further includes a handle. The handle is telescopically connected to an end of the front leg connected to the upper support member. The rear leg has a folding hook for engaging with the handle, such that the handle engages with the folding hook when the handle retracts into the front leg and the front leg is folded with respect to the bottom tube.

Preferably, the stroller frame further includes a seat fixing base for installing a seat. The seat fixing base is connected to the front leg. The upper support member is pivotally connected to the seat fixing base. The upper support member is pivotally connected to the front leg through the seat fixing base.

Preferably, the stroller frame further includes a fifth elastic member. The rear leg includes a transverse tube. The transverse tube is connected to the bottom tube. The lower support member is pivotally connected to the transverse tube, such that the lower support member is pivotally connected to the bottom tube through the transverse tube. A fourth sliding groove is formed between the lower support member and the transverse tube. The fifth elastic member is disposed in the fourth sliding groove and abuts against the lower support member and the transverse tube. The fifth elastic member buffers vibration of the lower support member and the transverse tube.

As will be seen more clearly from the detailed description following below, the claimed stroller includes a seat and the aforesaid stroller frame. The seat is detachably connected to the stroller frame.

BRIEF DESCRIPTION OF THE DRAWINGS

In the following, the invention is further illustrated by way of example, taking reference to the accompanying drawings thereof.

DETAILED DESCRIPTION

The embodiments of the invention will now be described with reference to the accompanying drawings, wherein similar numbers represent similar elements.

First Embodiment

Figure 1:
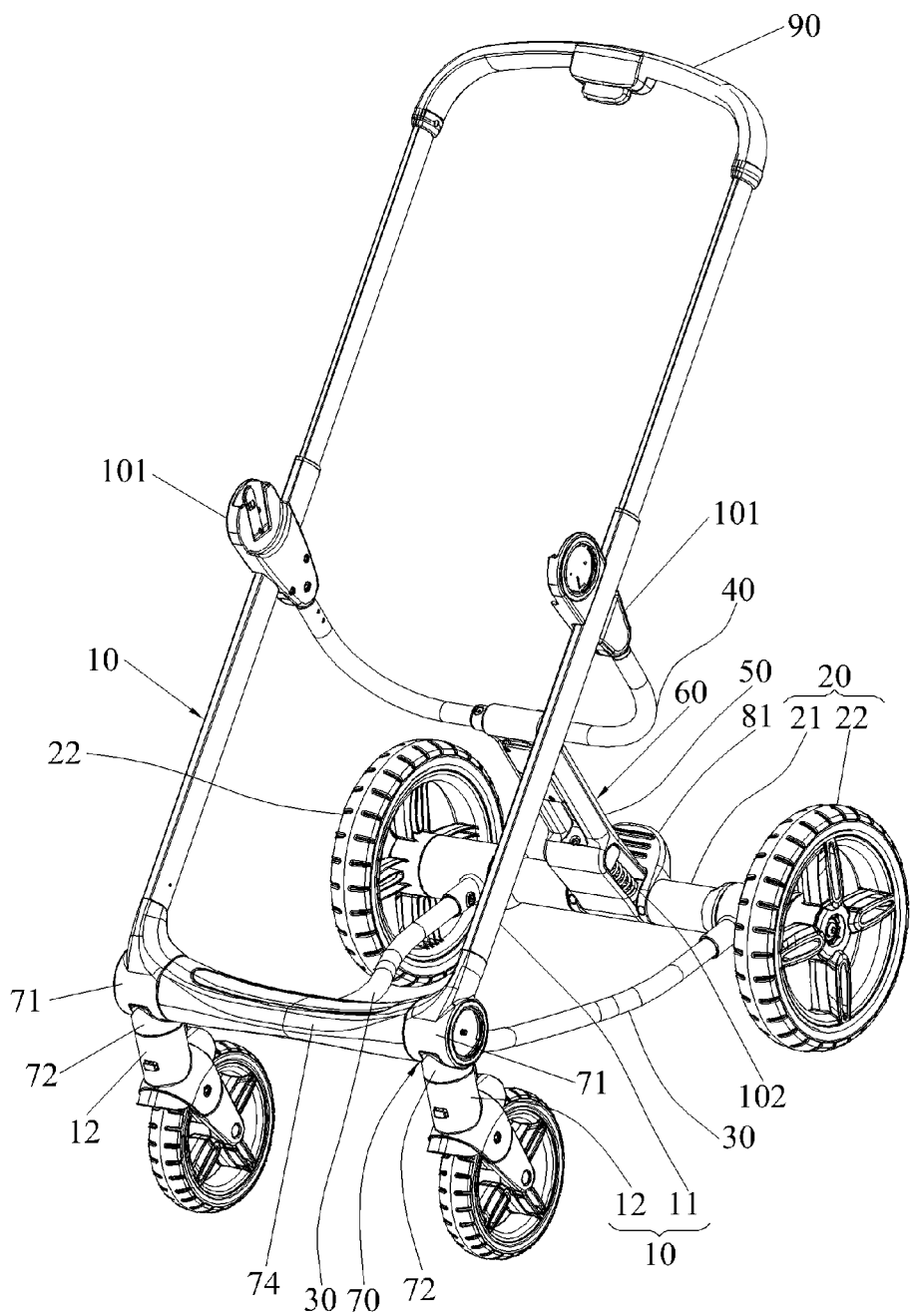
FIG. 1 is a schematic view illustrating the structure of the stroller frame of the first embodiment of the invention.
Figure 2:
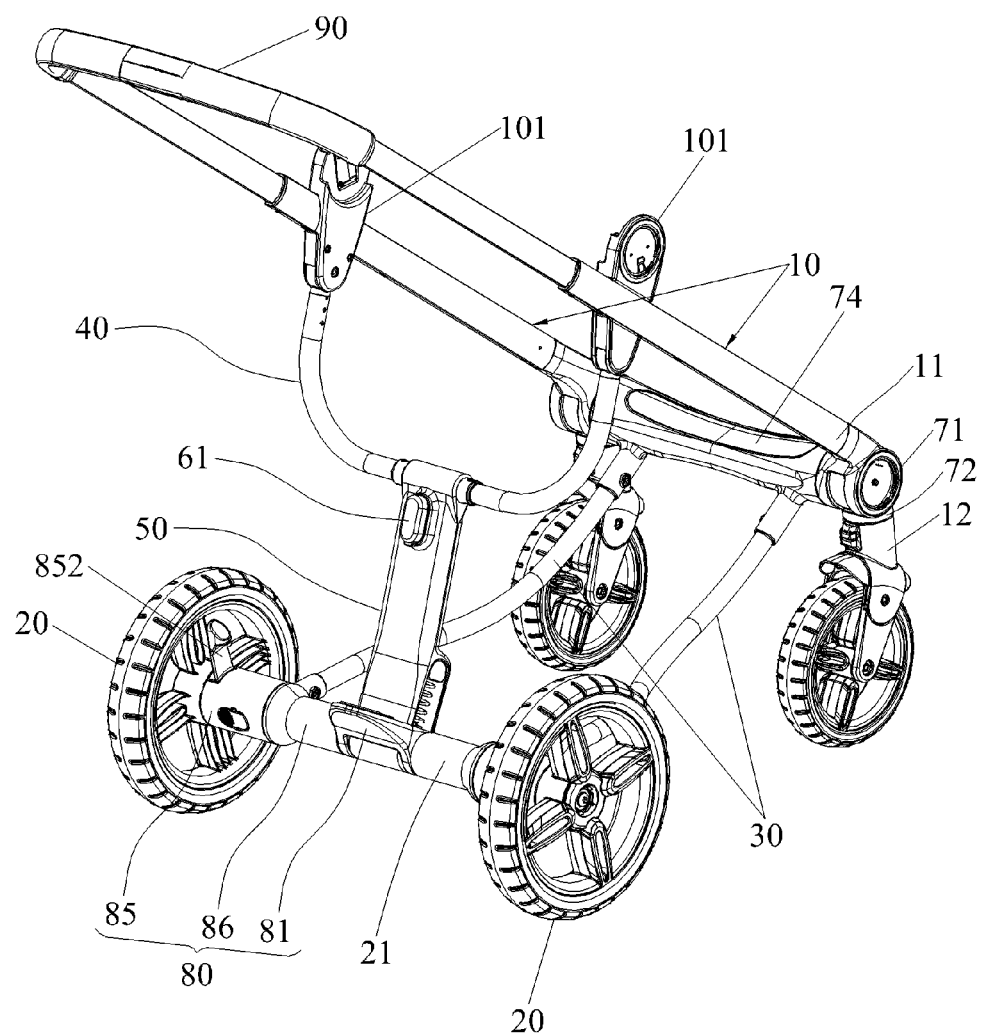
FIG. 2 is another schematic view illustrating the structure of the stroller frame of the first embodiment of the invention.

As shown in FIGS. 1 and 2, a stroller provided by this embodiment includes a seat (not shown) and a stroller frame 100. The seat is detachably connected to the stroller frame 100, such that the stroller is easy to be assembled and maintained. The stroller frame 100 includes a front leg 10, a bottom tube 30, a rear leg 20, an upper support member 40 and a lower support member 50. The front leg 10, the bottom tube 30, the upper support member 40 and the lower support member 50 are pivotally connected to each other to form a four-bar linkage structure. The rear leg 20 is connected to an end of the bottom tube 30 close to the lower support member 50. The stroller frame 100 can be flexibly folded through the aforesaid four-bar linkage structure. A lock mechanism 60 is disposed at a pivot joint between the upper support member 40 and the lower support member 50. The lock mechanism 60 is able to lock the upper support member 40 and the lower support member 50 at an expanded angle, such that the front leg 10 is able to be expanded with respect to the bottom tube 30. The lock mechanism 60 is unlocked to release the upper support member 40 and the lower support member 50, such that the front leg 10 is able to be folded with respect to the bottom tube 30. Accordingly, the stroller frame 100 of this embodiment can be expanded and folded.

Specifically, the rear leg 20 includes a transverse tube 21, the transverse tube 21 is connected to the bottom tube 30, and the lower support member 50 is pivotally connected to the transverse tube 21, such that that the lower support member 50 is pivotally connected to the bottom tube 30 through the transverse tube 21. A front end of the bottom tube 30 is pivotally connected the front leg 10, such that the front end of the bottom tube 30 can be folded and expanded with respect to the front leg 10. A rear end of the bottom tube 30 is connected to the transverse tube 21. When the front end of the bottom tube 30 is folded and expanded with respect to the front leg 10, the bottom tube 30 drives the transverse tube 21 to be folded and expanded synchronously. Preferably, the upper support member 40 is U-shaped. Opposite ends of the upper support member 40 are pivotally connected the corresponding ends of the front leg 10. The upper support member 40 swings with respect to the front leg 10 with its two ends connected as a rotation axis. The lower support member 50 are pivotally connected to the upper support member 40 and the transverse tube 21 to restrain relative movement of the upper support member 40 and the transverse tube 21. Preferably, the lower support member 50 are pivotally connected to middle portions of the upper support member 40 and the transverse tube 21, such that when the upper support member 40 and the transverse tube 21 move relative to each other, the forces on both sides are balanced. Accordingly, the invention can effectively ensure stable relative movement of the upper support member 40 and the transverse tube 21 and extend the life of the stroller frame 100.

The lock mechanism 60 selectively locks the upper support member 40 and the lower support member 50 to indirectly lock the front leg 10 and the rear leg 20, so as to restrain relative swing of the front leg 10 and the rear leg 20 and lock the stroller frame 100 in the expanded state. When the stroller frame 100 is in the expanded state, the lock mechanism 60 locks the upper support member 40 and the lower support member 50. At this time, the front leg 10 and the rear leg 20 are locked, such that the rear leg 20 cannot swing with respect to the front leg 10. The front leg 10 and the rear leg 20 are in a relatively static state, such that the stroller frame 100 is locked in the expanded state.

The specific structure of the stroller frame 100 of this embodiment will be described in detail below.

As shown in FIGS. 1 to 5, the lock mechanism 60 of this embodiment includes an operating member 61, an engaging member 62 and a fixing member 63 engaging with the engaging member 62. The engaging member 62 is movably disposed on the lower support member 50. The fixing member 63 is disposed on the upper support member 40. The fixing member 63 corresponds to and engages with the engaging member 62 when the upper support member 40 and the lower support member 50 are situated at the expanded angle. The operating member 61 is connected to the engaging member 62 and controls the engaging member 62 to be disengaged from the fixing member 63 to unlock the lock mechanism 60. Preferably, the engaging member 62 is slidably connected to the lower support member 50 and able to slide with respect to the lower support member 50 to engage with or disengage from the fixing member 63.

Specifically, the engaging member 62 is close to the upper support member 40, such that the lower support member 50 and the upper support member 40 engage with each other to lock the upper support member 40 and the lower support member 50, so as to avoid the relative movement of the upper support member 40 and the transverse tube 21. The engaging member 62 is away from the upper support member 40, such that the lower support member 50 and the upper support member 40 disengage from each other to unlock the upper support member 40 and the lower support member 50, so as to make the upper support member 40 and the transverse tube 21 move relative to each other. Accordingly, the invention can lock and unlock the upper support member 40 and the lower support member 50 by controlling the relative relationship between the engaging member 62 and the upper support member 40.

Figure 4:
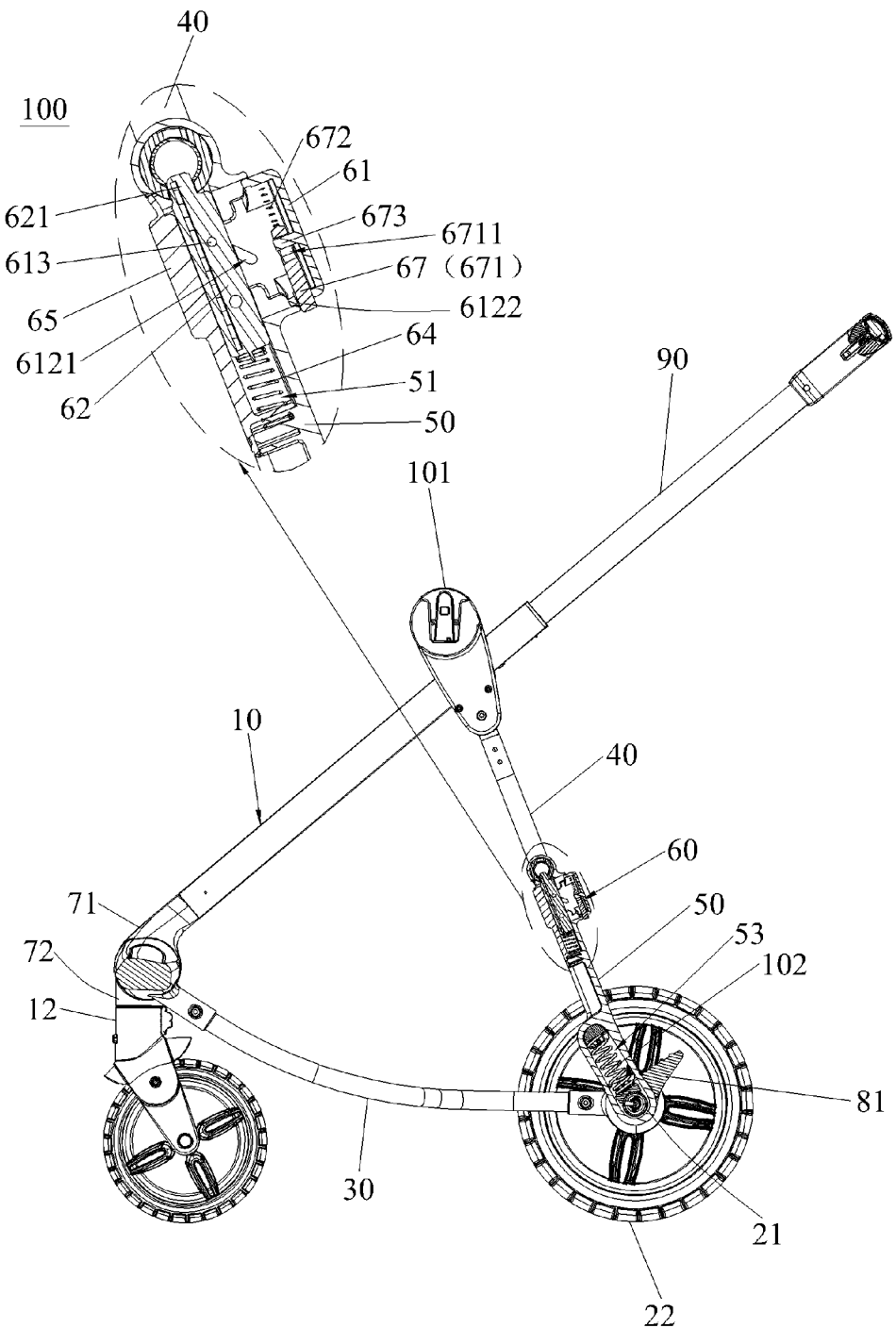
FIG. 4 is a side view illustrating the upper support member and the lower support member shown in FIG. 1 in the lock state.
Figure 5:
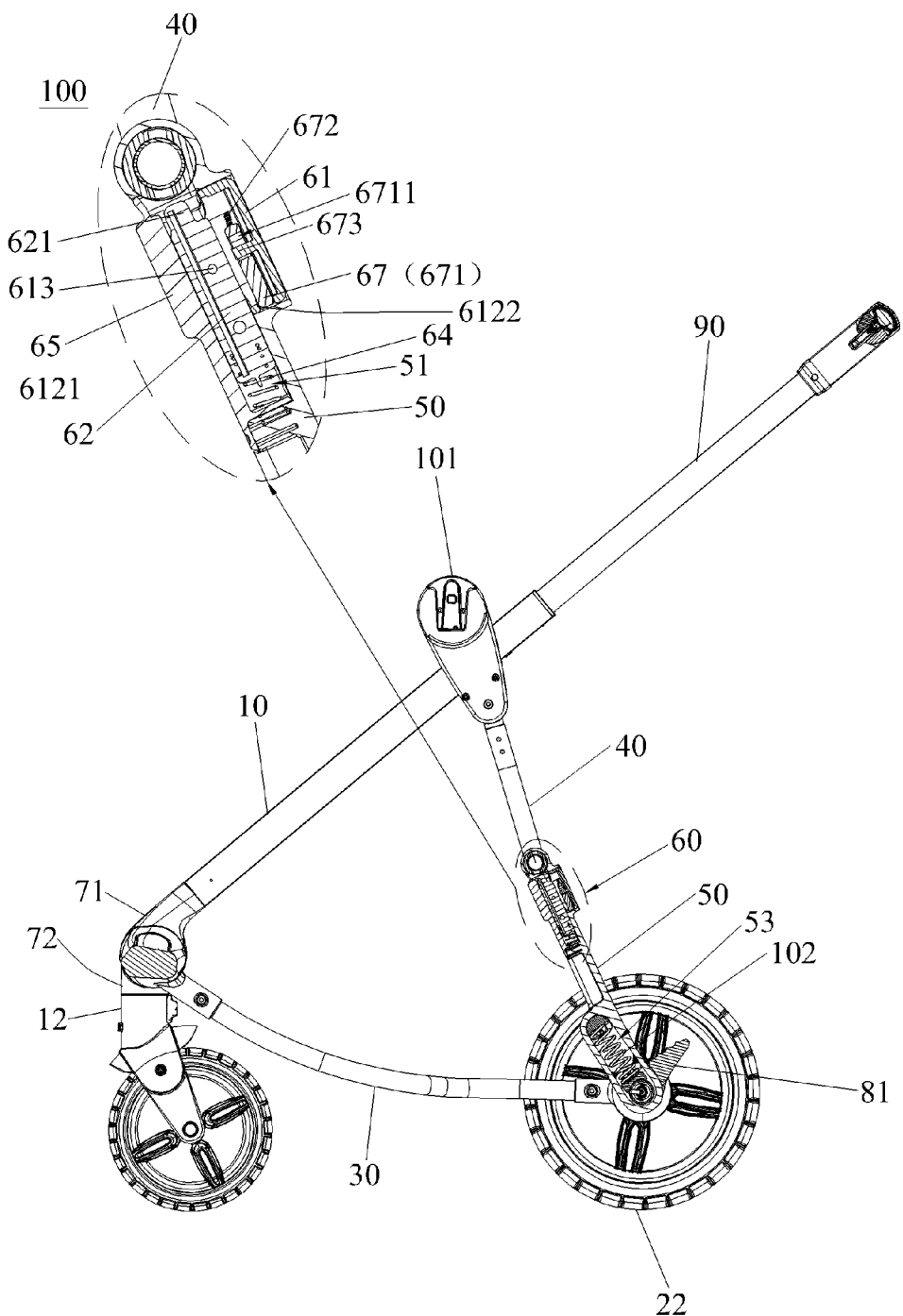
FIG. 5 is a side view illustrating the upper support member and the lower support member shown in FIG. 1 in the unlock state.
Figure 6:
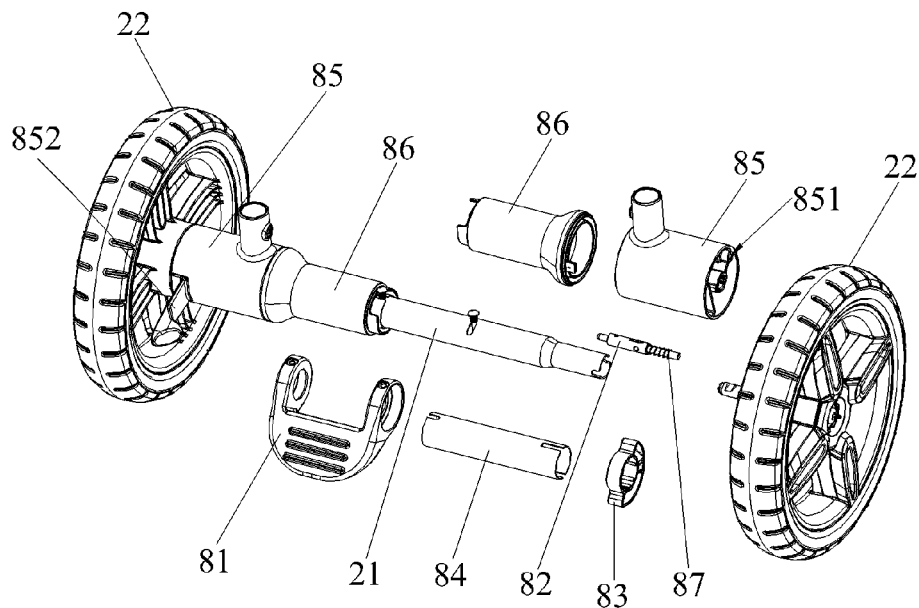
FIG. 6 is a partially exploded view illustrating the brake mechanism, the transverse tube and the rear wheel of the first embodiment of the invention.

Preferably, the fixing member 63 of this embodiment is an engaging recess disposed on the upper support member 40 and the engaging member 62 includes an engaging block 621 matching with the engaging recess. The engaging block 621 protrudes from an upper end of the engaging member 62. The engaging recess is specifically formed on the upper support member 40 and corresponds to the engaging block 621 when the stroller frame 100 is expanded. When the engaging member 62 is close to the upper support member 40, the engaging block 621 engages with the engaging recess (as shown in FIG. 4) to lock the upper support member 40 and the lower support member 50. At this time, the engaging member 62 restrains the upper support member 40 from swinging with respect to the front leg 10 and keeps the upper support member 40 and the lower support member 50 static relative to each other, such that the stroller frame 100 is kept in the expanded state. When the engaging member 62 is away from the upper support member 40, the engaging block 621 disengages from the engaging recess (as shown in FIG. 5) to unlock the upper support member 40 and the lower support member 50. At this time, the engaging block 621 disengages from the upper support member 40 to enable the upper support member 40 to swing with respect to the front leg 10, such that the stroller frame 100 is unlocked and able to be folded.

As shown in FIGS. 1 to 5, the operating member 61 includes a first operating portion 611, a first transmitting portion 612, a sliding block 613 and a first elastic member 64. The first transmitting portion 612 is connected to the first operating portion 611. The first transmitting portion 612 is disposed on the lower support member 50 along a direction perpendicular to a moving direction of the engaging member 62 and has a first inclined groove 6121 inclining with respect to the moving direction of the engaging member 62. The sliding block 613 is slidably connected to the first inclined groove 6121 and disposed on the engaging member 62. Preferably, the sliding block 613 protrudes from the engaging member 62 and located on a side wall of the engaging member 62 close to the operating member 61. The first operating portion 611 is operated to drive the first transmitting portion 612 to slide with respect to the lower support member 50, such that the sliding block 613 slides along the first inclined groove 6121 to disengage the engaging member 62 from the fixing member 63. In this embodiment, the sliding block 613 is connected to the engaging member 62 and partially protrudes from a side wall of the engaging member 62 close to the operating member 61.

Specifically, the lock mechanism 60 further includes a decorative cover 65 connected to the lower support member 50. The decorative cover 65 has a sliding groove 651 for the engaging member 62 to slide therein. The first operating portion 611 is operated to drive the first transmitting portion 612 to slide with respect to the lower support member 50, such that the sliding block 613 slides along the first inclined groove 6121 to drive the engaging member 62 to slide along the sliding groove 651 to disengage from the fixing member 63, so as to complete the unlock.

Specifically, the first inclined groove 6121 is inclined and disposed on a side wall of the operating member 61 corresponding to the sliding block 613, so as to form a relative high position and a relative low position. When the sliding block 613 is located at the relative high position of the first inclined groove 6121, the engaging member 62 is close to the upper support member 40. When the sliding block 613 is located at the relative low position of the first inclined groove 6121, the engaging member 62 is away from the upper support member 40. The first elastic member 64 is connected to the engaging member 62 and provides an elastic force for the engaging member 62 to engage with the fixing member 63. The first elastic member 64 is specifically a spring. The lower support member 50 has a first sliding groove 51 for the engaging member 62 to slide therein. The engaging member 62 is disposed and restrained to slide in the first sliding groove 51, such that the engaging member 62 slides in a direction toward the engaging recess.

The first elastic member 64 is disposed in the first sliding groove 51 and contacts the engaging member 62. An end of the first elastic member 64 abuts against a lower end of the engaging member 62 and another end of the first elastic member 64 abuts against a bottom of the first sliding groove 51, such that the first elastic member 64 always biases the engaging member 62 toward the upper support member 40. Accordingly, when the stroller frame 100 is expanded, the engaging block 621 always enters and engages with the engaging recess. In other words, the upper support member 40 and the lower support member 50 are always in the engaged state under the expanded state, so as to prevent the stroller frame 100 from being folded accidentally. In this embodiment, the first elastic member 64 may be connected to the lower end of the engaging member 62 and the bottom of the first sliding groove 51 or, alternatively, may just abut against the engaging member 62 and the first sliding groove 51. The invention does not limit the specific arrangement of the first elastic member 64 as long as the first elastic member 64 always biases the engaging member 62 toward the upper support member 40.

As shown in FIGS. 1 to 5, in specific use, it is assumed that the position of the operating member 61 in the expanded stroller frame 100 is an initial position. When the expanded stroller frame 100 needs to be folded, the user presses the first operating member 611 downward in the expanded state of the stroller frame 100. The first operating portion 611 drives the first transmitting portion 612 to move downward, thereby causing the first inclined groove 6121 moves downward synchronously, i.e. the sliding block 613 moves downward with respect to the first inclined groove 6121. At this time, the sliding block 613 gradually declines along the relative high position of the first inclined groove 6121 to the relative low position of the first inclined groove 6121. Since the engaging member 62 is restrained to slide in the first sliding groove 51, when the sliding block 613 moves downward with respect to the first inclined groove 6121, the engaging member 62 slides in the first sliding groove 51 and away from the engaging recess to disengage the engaging block 621 from the engaging recess. Accordingly, the lock mechanism 60 unlocks the upper support member 40 to fold the stroller frame 100.

When the folded stroller frame 100 needs to be expanded and locked, the stroller frame 100 is expanded and then the engaging member 62 moves toward the engaging recess due to the elastic return force of the first elastic member 64, such that the engaging block 621 enters the engaging recess to lock the upper support member 40. When the engaging member 62 is moving toward the engaging recess, the first operating portion 611 gradually returns to the initial position to drive the first transmitting portion 612 to return to the initial position. At this time, the first inclined groove 6121 declines and the sliding block 613 moves upward with respect to the first inclined groove 6121. At this time, the sliding block 613 gradually rises along the relative low position of the first inclined groove 6121 to the relative high position of the first inclined groove 6121. Since the engaging member 62 is restrained to slide in the first sliding groove 51, when the sliding block 613 moves upward along the first inclined groove 6121, the engaging member 62 slides in the first sliding groove 51 and close to the engaging recess and the engaging block 621 enters the engaging recess to engage the engaging member 62 in the engaging recess. Accordingly, the lock mechanism 60 locks the upper support member 40.

Figure 3:
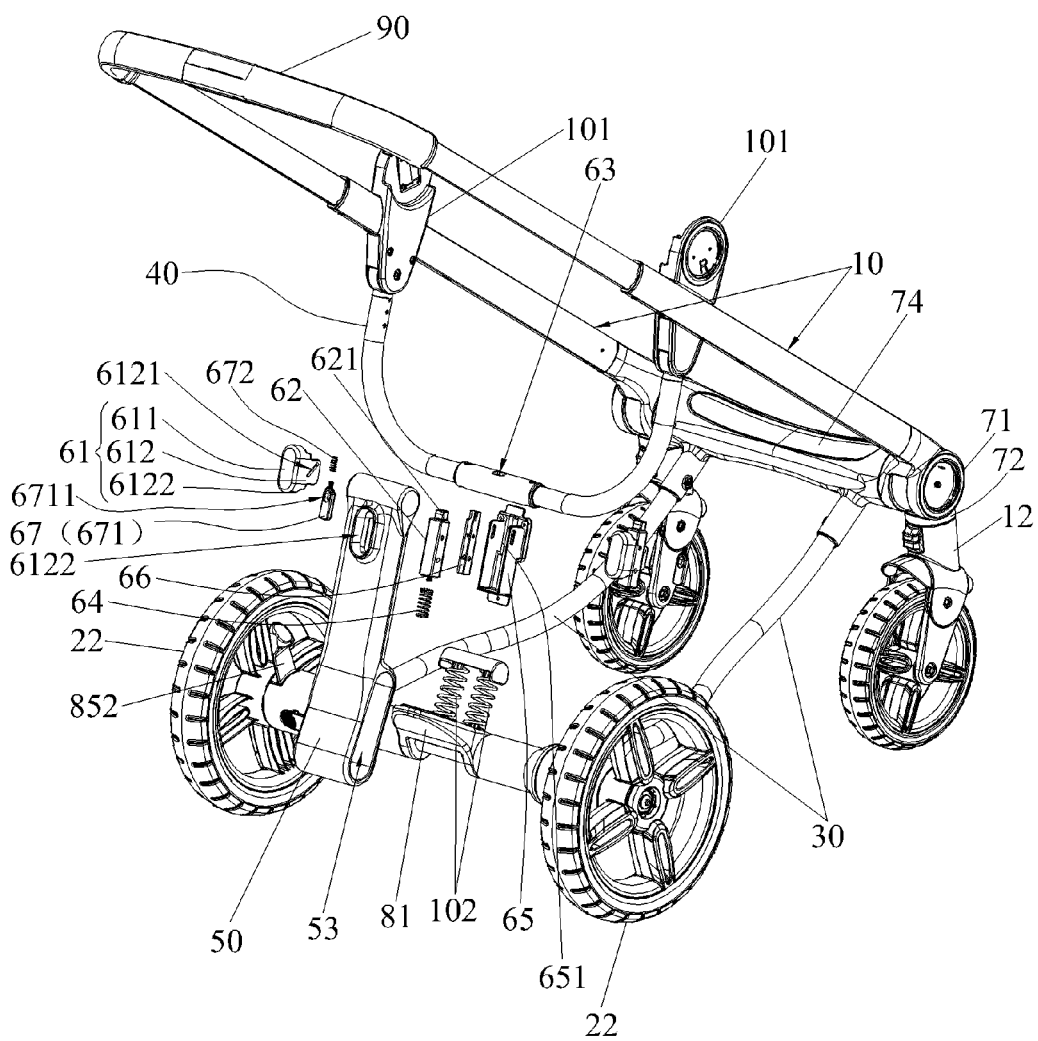
FIG. 3 is an exploded view illustrating the lock mechanism shown in FIG. 2.

As shown in FIGS. 3 to 5, the lock mechanism 60 further includes a first reinforcing member 66. The decorative cover 65 is disposed on the first sliding groove 51 and covers the first sliding groove 51 to enclose the engaging member 62 in the first sliding groove 51, so as to prevent the engaging member 62 from being exposed to the external environment and prevent dust other impurities from entering the first sliding groove 51 and affecting the sliding of the engaging member 62 in the first sliding groove 51. At the same time, the decorative cover 65 plays a decorative role and enhances the beauty of the lock mechanism 60. The first reinforcing member 66 is disposed on the engaging member 62 to increase the rigidity of the engaging member 62, so as to avoid damage to the engaging member 62 during sliding and engaging with the engaging recess and extend the life of the engaging member 62.

As shown in FIGS. 1 to 5, the lock mechanism 60 of the invention further includes a second safety lock 67 and the second safety lock 67 selectively restrains an operation of the operating member 61, so as to avoid accidental folding of the stroller frame 100 due to misoperation. The second safety lock 67 includes a second operating portion 671. The second operating portion 671 is movably connected to the operating member 61. The second operating portion 671 is operated to move to an unlock position and a lock position with respect to the operating member 61. The second operating portion 671 engages with the operating member 61 at the unlock position to restrain the operation of the operating member 61. The second operating portion 671 disengages from the operating member 61 at the lock position to unlock the operating member 61.

Specifically, the operating member 61 has a second sliding groove 6122 for the second operating portion 671 to slide therein. When the second operating portion 671 slides along the second sliding groove 6122, the second operating portion 671 may protrude from the operating member 61 or retract into the operating member 61. By controlling the relative relationship between the second operating portion 671 and the operating member 61, it is controlled whether the second safety lock 67 restricts the operation of the operating member 61. When the second operating portion 671 is in the lock position, the second operating portion 671 protrudes from the operating member 61. The second operating portion 671 protrudes from the operating member 61 to interfere with the operating member 61 and restricts the operating member 61 from being pressed down in the initial position to restrict the operation of the operating member 61. When the second operating portion 671 is in the unlock position, the second operating portion 671 retracts into the operating member 61. At this time, external force can press down the operating member 61 to release the restriction on the operating member 61.

Furthermore, the second safety lock 67 further includes a second elastic member 672 and the second elastic member 672 provides an elastic force for the second operating portion 671 to lock the operating member 61. The second elastic member 672 is specifically a spring. A restraining member 673 is disposed in the second sliding groove 6122. The second operating portion 671 has a restraining groove 6711 for the restraining member 673 to pass through. The second operating portion 671 is restrained to slide in the second sliding groove 6122 by the restraining member 673 and the restraining groove 6711.

Still further, the second elastic member 672 is disposed in the second sliding groove 6122 and contacts the second operating portion 671. Specifically, an end of the second elastic member 672 is sleeved on an end of the second operating portion 671 close to the engaging recess and another end of the second elastic member 672 abuts against an inner wall of the second sliding groove 6122 close to a side of the engaging recess. The second elastic member 672 is compressed between the second operating portion 671 and the inner wall of the second sliding groove 6122, such that the second elastic member 672 always biases the second operating portion 671 out of the operating member 61. That is to say, the second operating portion 671 always protrudes from the operating member 61 in a natural state, such that the second operating portion 671 always restricts the pressing operation of the operating member 61 in a natural state. When it is necessary to release the pressing operation restriction on the operating member 61 caused by the second operating portion 671, the user pushes the second operating portion 671, and the second operating portion 671 overcomes the elastic force of the second elastic member 672 and completely retracts into the second sliding groove 6122. Then, the pressing operation restriction on the operating member 61 caused by the second operating portion 671 can be released.

It should be noted that this embodiment provides the arrangement of the second operating portion 671 movably connected to the operating member 61. Needless to say, the second operating member 671 may also be movably connected to the lower support member 50. At this time, the restraining member 673 is disposed between the second operating portion 671 and the lower support member 50. The second operating member 671 engages with the lower support member 50 at the unlock position to restrain the operation of the operating member 61 and disengages from the operating member 61 at the lock position to unlock the operating member 61. The specific position where the second operating portion 671 is movably connected to is determined according to practical applications, so the invention is not limited to the aforesaid embodiments.

Figure 7:
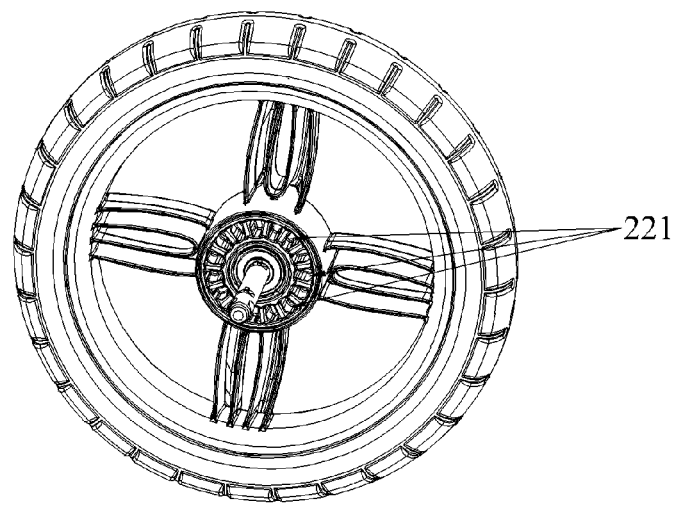
FIG. 7 is a schematic view illustrating the structure of the rear wheel of the first embodiment of the invention.
Figure 14:
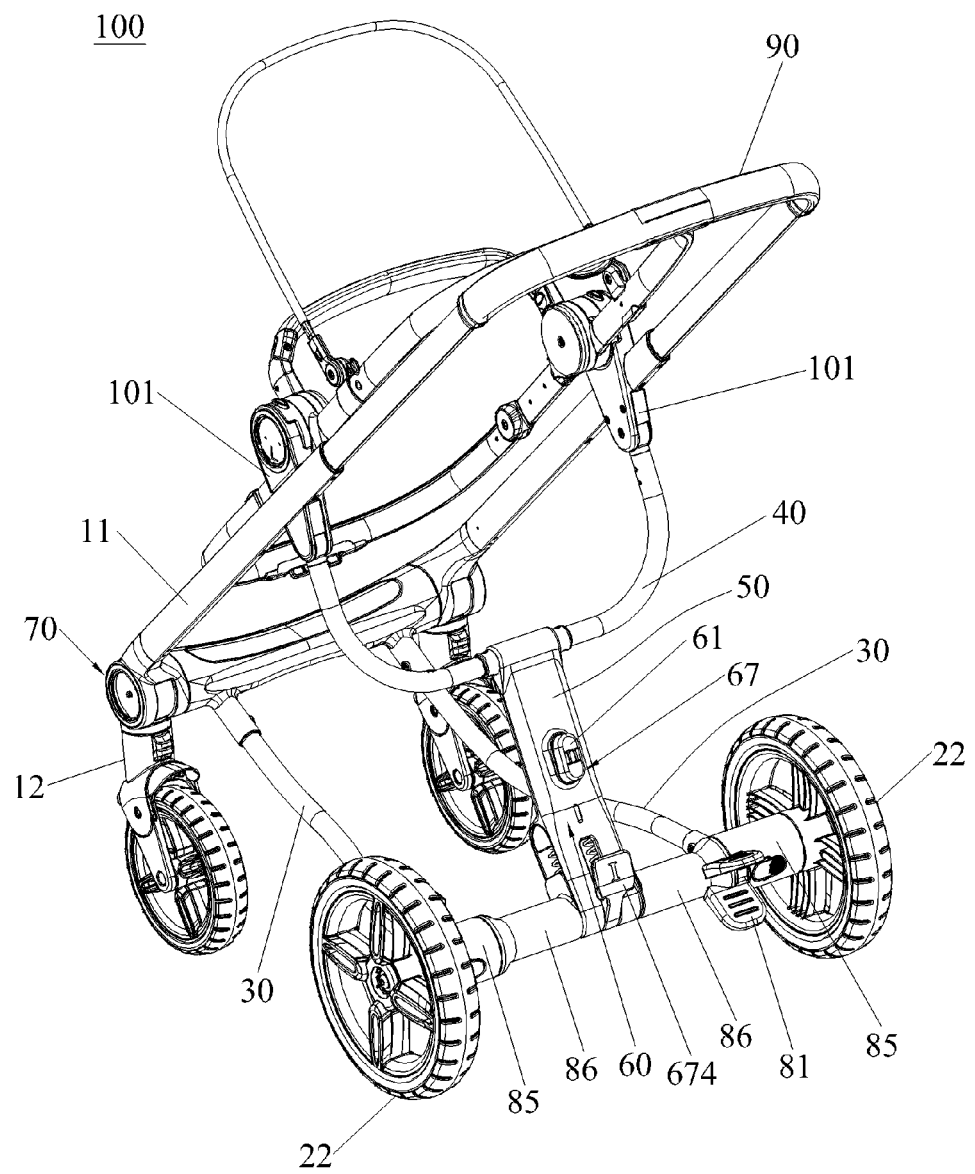
FIG. 14 is a schematic view illustrating the structure of the stroller frame of the second embodiment of the invention.

As shown in FIGS. 1, 2, 3, 6 to 9, and 14, the stroller frame 100 of this embodiment further includes a brake mechanism 80. The brake mechanism 80 is disposed on the transverse tube 21 and opposite ends of the transverse tube 21 are equipped with the rear wheel 22. The brake mechanism 80 may be operated to selectively brake the rear wheel 22. The brake mechanism 80 includes a brake pedal 81, a brake pin 82, and a driving member 83 sleeved on the transverse tube 21 and able to rotate around an axle center of the transverse tube 21. The brake pedal 81 is movably disposed on the transverse tube 21 and drives the driving member 83 to rotate. The brake pedal 81 may be disposed on any position of the transverse tube 21. FIG. 2 is a schematic view illustrating the structure of the stroller frame 100 when the brake pedal 81 is disposed on a middle position of the transverse tube 21. FIG. 14 is a schematic view illustrating the structure of the stroller frame 100 when the brake pedal 81 is disposed on the transverse tube 21 close to any rear wheel 22. As shown in FIG. 7, a circumference of the rear wheel 22 has a plurality of brake holes 221 for receiving the brake pin 82. The brake pedal 81 is operated to selectively drive the driving member 83 to rotate, such that the driving member 83 drives the brake pin 82 to move toward the rear wheel 22 to be inserted into one of the brake holes 221 to brake the rear wheel 22.

Figure 8:
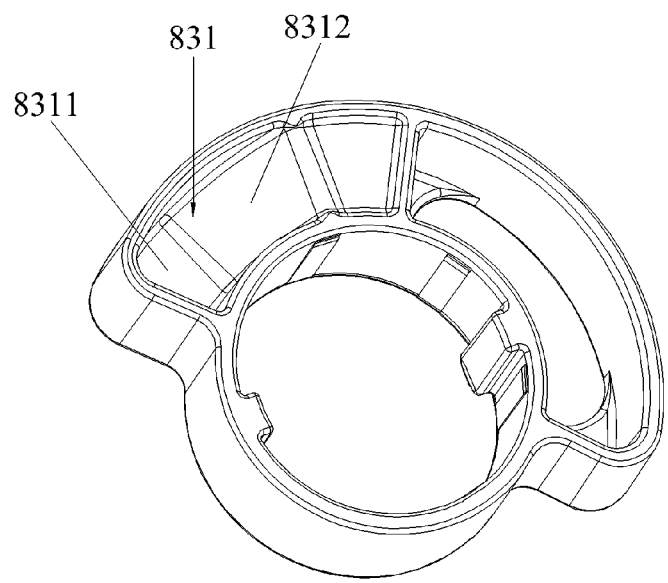
FIG. 8 is a schematic view illustrating the structure of the driving member of the first embodiment of the invention.
Figure 9:
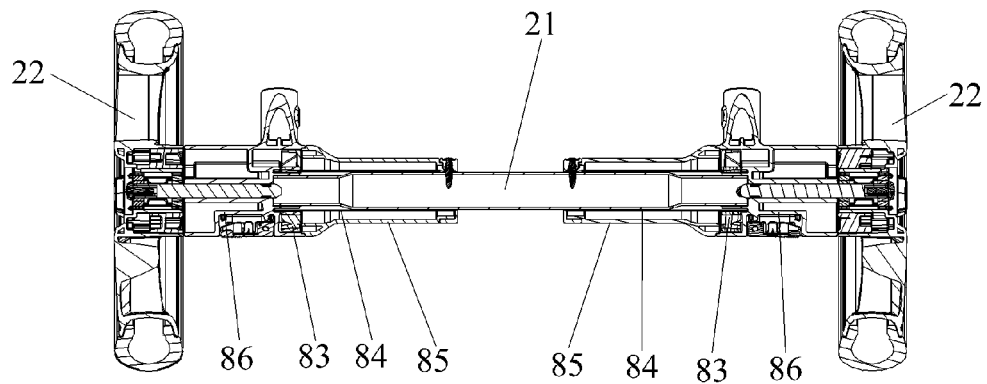
FIG. 9 is a sectional view illustrating the assembly of the brake mechanism, the transverse tube and the rear wheel of the first embodiment of the invention.

Specifically, as shown in FIG. 8, the driving member 83 has a first recess 831. The first recess 831 includes a bottom wall 8311. The bottom wall 8311 is inclined and extended to form an inclined wall 8312, wherein the inclined wall 8312 is inclined along a rotating direction of the driving member 83. The brake pin 82 is slidably connected to the transverse tube 21 and abuts against the inclined wall 8312. There is a distance difference between different positions on the inclined wall 8312 and the bottom wall 8311 relative to the rear wheel 22. The distance difference between the bottom wall 8311 and the rear wheel 22 is larger than the distance difference between the inclined wall 8312 and the rear wheel 22. When the brake pin 82 abuts against the inclined wall 8312, the brake pin 82 is inserted into the brake hole 221 to brake the rear wheel 22. When the brake pin 82 abuts against the bottom wall 8311, the brake pin 82 is away from the brake hole 221 to release the brake of the rear wheel 22.

As shown in FIGS. 1, 2, 3, 6 to 9, and 14, the brake mechanism 80 further includes a sleeve 84, a first connecting member 85 for connecting the rear wheel 22, a second connecting member 86, and a fourth elastic member 87. The sleeve 84 is sleeved on the transverse tube 21 and able to rotate around an axle center of the transverse tube 21. The first connecting member 85 is disposed on the transverse tube 21 and static with respect to the sleeve 84. The first connecting member 85 has a through hole 851 for the brake pin 82 to pass through along the axial direction of the transverse tube 21. The brake pin 82 is disposed in the through hole 851 and able to move along the axial direction of the transverse tube 21. The second connecting member 86 is disposed on the transverse tube 21 and located between the lower support member 50 and the first connecting member 85. The first connecting member 85 and the second connecting member 86 jointly cover the transverse tube 21 and the driving member 83 is sealed and assembled between the first connecting member 85 and the second connecting member 86. The fourth elastic member 87 is specifically a spring. The fourth elastic member 87 provides an elastic force for ejecting the brake pin 82 out of the brake hole 221.

Specifically, an end of the fourth elastic member 87 is sleeved on an end of the brake pin 82 close to the rear wheel 22 and another end of the fourth elastic member 87 abuts against the through hole 851, such that the fourth elastic member 82 is always away from the brake hole 221 in a natural state, i.e. the rear wheel 22 is able to rotate free in a natural state.

Figure 13:
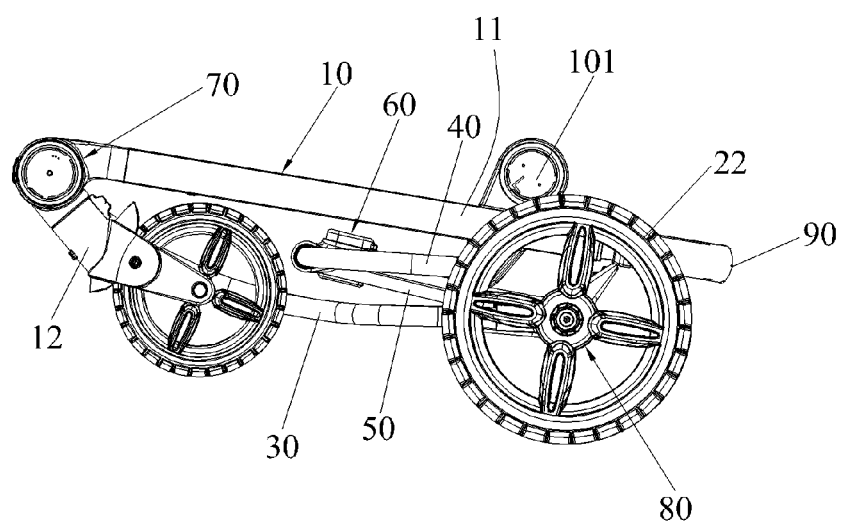
FIG. 13 is a sectional view illustrating the handle of the first embodiment of the invention retracting into the front leg when the stroller frame is folded.

As shown in FIGS. 1, 2, 3 and 13, the stroller frame 100 of this embodiment further includes a handle 90 and a seat fixing base 101 for installing a seat. The handle 90 is telescopically connected to an end of the front leg 10 connected to the upper support member 40. The telescopic length of the handle 90 may be adjusted to further reduce the size of the folded stroller frame 100. FIG. 1 is a schematic view illustrating that the handle 90 extends out of the front leg 10 when the stroller frame 100 is expanded. FIG. 13 is a schematic view illustrating that the handle 90 retracts into the front leg 10 when the stroller frame 100 is folded.

Figure 10:
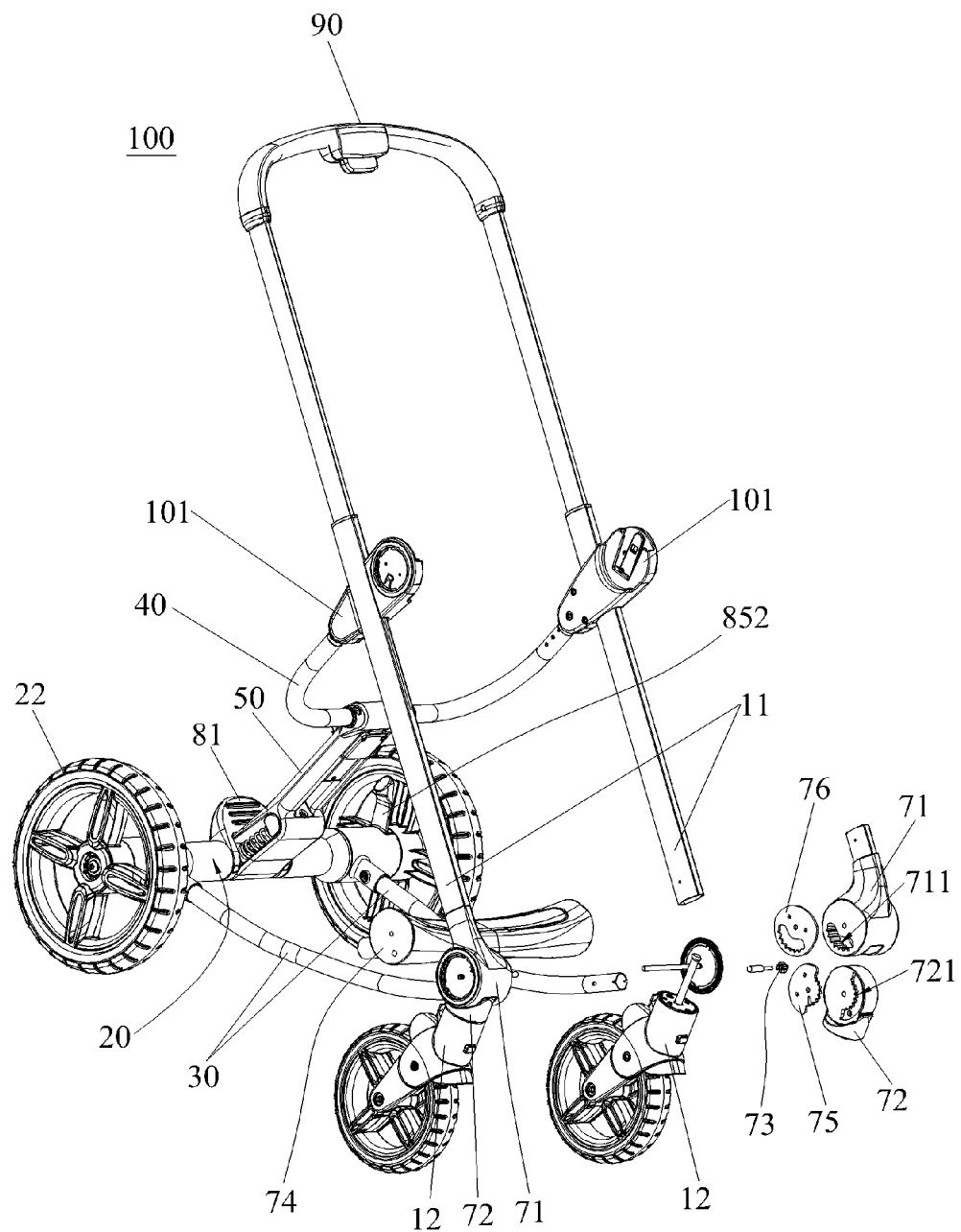
FIG. 10 is an exploded view illustrating the linkage mechanism shown in FIG. 1.
Figure 11:
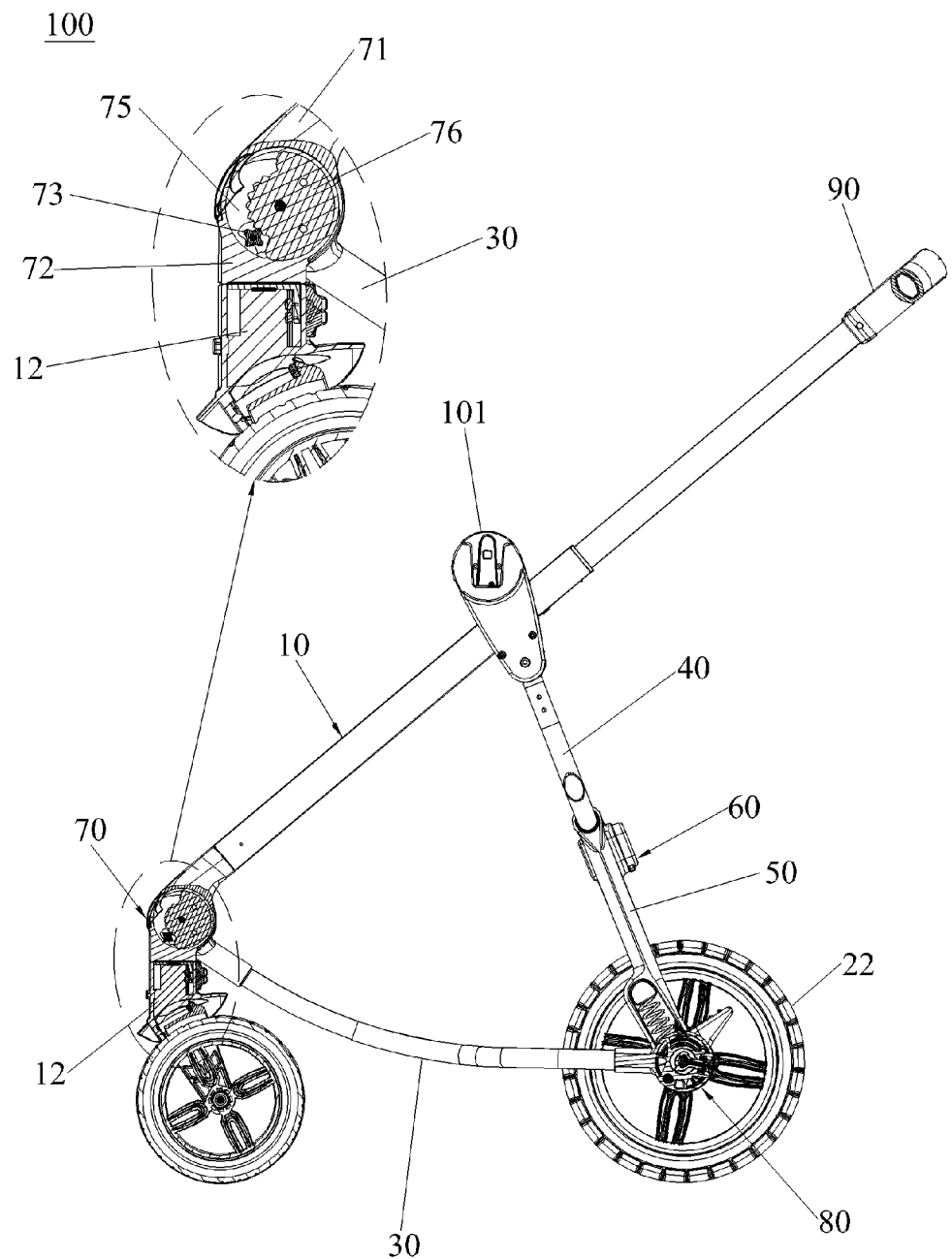
FIG. 11 is a sectional view illustrating the linkage mechanism of the first embodiment of the invention when the stroller frame is expanded.
Figure 12:
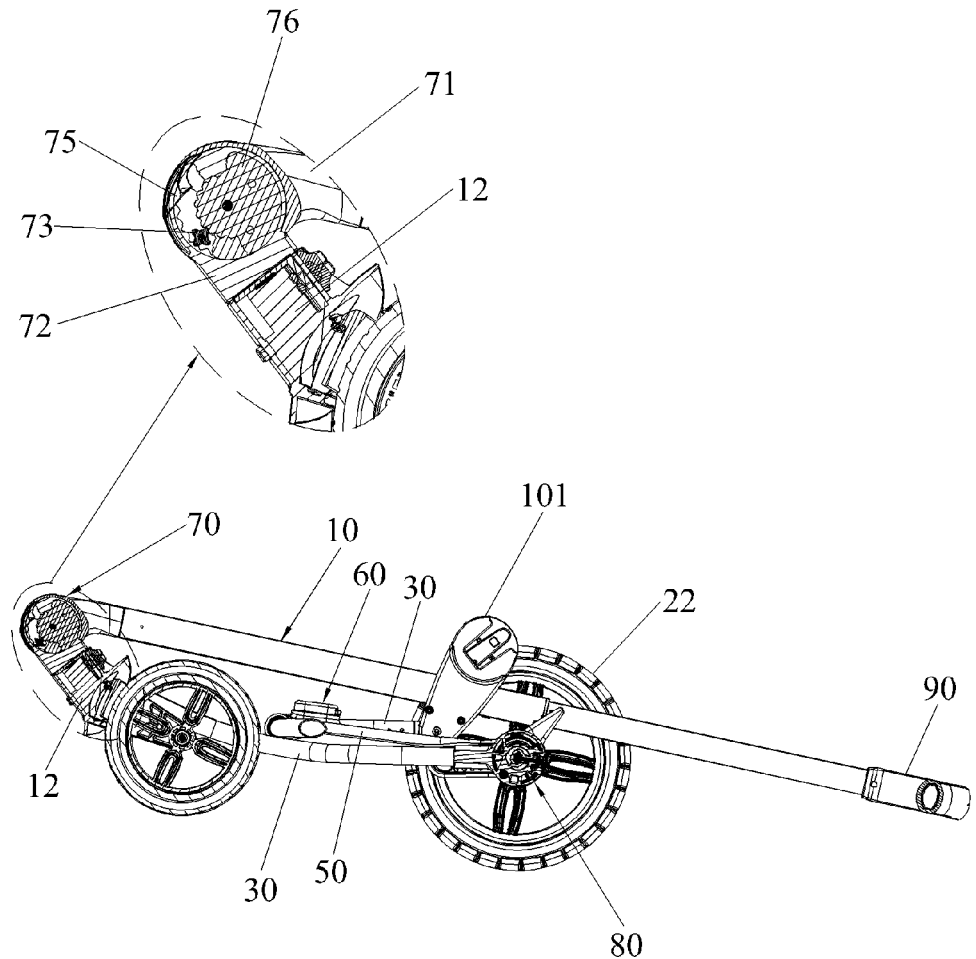
FIG. 12 is a sectional view illustrating the linkage mechanism of the first embodiment of the invention when the stroller frame is folded.

In order to better maintain the folded state of the stroller frame 100 to prevent the handle 90 from expanding and accidentally extending with respect to the bottom tube 30, the rear leg 20 of this embodiment has a folding hook 852 (as shown in FIG. 10) for engaging with the handle 90, such that the handle 90 engages with the folding hook 852 when the handle 90 retracts into the front leg 10 and the front leg 10 is folded with respect to the bottom tube 30. Preferably, the folding hook 852 is disposed on the first connecting member 85. The folding hook 852 is elastic. After the stroller frame 100 is folded, the corresponding position of the handle 90 may be engaged with the folding hook 852, such that the folded stroller frame 100 will not expand accidentally. The folding hook 852 not only can engage with the handle 90 extending out of the front leg 10 but also can engage with the handle 90 retracting into the front leg 10, so the invention is not limited to a specific manner.

As shown in FIGS. 1 to 5, in order to improve the comfort of the stroller of this embodiment during travel, the stroller frame 100 of this embodiment further includes a fifth elastic member 102. The fifth elastic member 102 is specifically a spring. The lower support member 50 has a fourth sliding groove 53 (as shown in FIG. 4). The transverse tube 21 passes through the fourth sliding groove 53 and is pivotally connected to a lower end of the lower support member 50. The fifth elastic member 102 is disposed in the fourth sliding groove 53 and abuts against the lower support member 50 and the transverse tube 21. The fifth elastic member 102 buffers vibration of the lower support member 50 and the transverse tube 21, so as to avoid direct transmission of the vibration generated by the stroller during travel to infants and children, thereby effectively improving the comfort of the stroller during travel.

As shown in FIGS. 1, 2, 3, and 10 to 12, in order to further reduce the size of the folded stroller frame 100, the stroller frame 100 of this embodiment further includes a linkage mechanism 70 arranged in linkage with the lock mechanism 60. The front leg 10 includes a front leg rod 11 and a front wheel member 12. The front wheel member 12 is rotatably connected to the front leg rod 11 to form a first pivot point. The front leg rod 11 is pivotally connected to the bottom tube 30 to form a second pivot point. The linkage mechanism 70 is disposed between the first pivot point and the second pivot point, such that the linkage mechanism 70 drives the front wheel member 12 to be folded with respect to the front leg rod 11 when the front leg rod 11 is folded with respect to the bottom tube 30.

Specifically, the front wheel member 12 is rotatably disposed on the front leg rod 11 along the transverse tube 21 relative to the front leg rod 11 in the folding and expanding directions. The linkage mechanism 70 is pivotally connected to the bottom tube 30 and the front wheel member 12. When the stroller frame 100 is folded or expanded, the linkage mechanism 70 drives the front wheel member 12 to be folded or expanded synchronously, so as to effectively reduce the size and packaging materials of the stroller frame 100. The linkage mechanism 70 includes a first gear plate 71 disposed on the front leg rod 11, a second gear plate 72 disposed on the front wheel member 12, and a synchromesh gear 73 disposed on the bottom tube 30. The synchromesh gear 73 meshes with teeth of the first gear plate 71 and teeth of the second gear plate 72 synchronously. The second gear plate 72 has first teeth 721 meshing with the synchromesh gear 73 and the first gear plate 71 has second teeth 711 meshing with the synchromesh gear 73. When the bottom tube 30 drives the transverse tube 21 to be folded or expanded with respect to the front leg 10, the first gear plate 71 rotates with respect to the second gear plate 72. The first gear plate 71 drives the front wheel member 12 to be folded and expanded synchronously, so as to fold or expand the front wheel synchronously.

As shown in FIGS. 1, 2, 3, and 10 to 12, the linkage mechanism 70 further includes a connecting plastic 74, a second reinforcing member 75 and a third reinforcing member 76. Opposite ends of the connecting plastic 74 are connected to the corresponding front leg rods 11, such that two front leg rods 11 are formed integrally. The front wheel member 12 is disposed on a corresponding end of the connecting plastic 74. The front leg rod 11, the connecting plastic 74 and the front wheel member 12 jointly form the integrated front leg 10. The second reinforcing member 75 is disposed on the second gear plate 72 to reinforce the rigidity of the second gear plate 72. The third reinforcing member 76 is disposed on the first gear plate 71 to reinforce the rigidity of the first gear plate 71. Accordingly, the rigidity and durability of the first gear plate 71 and the second gear plate 72 are improved.

It should be noted that the first gear plate 71 of this embodiment is disposed on the front leg rod 11 and the synchromesh gear 73 is disposed on the bottom tube 30. In another embodiment, the first gear plate 71 is disposed on the bottom tube 30 and the synchromesh gear 73 is disposed on the front leg rod 11. The invention does not limit the relative arrangement of the first gear plate 71 and the second gear plate 72 as long as the synchromesh gear 73 meshes with the first gear plate 71 and the second gear plate 72 synchronously.

Second Embodiment

Figure 15:
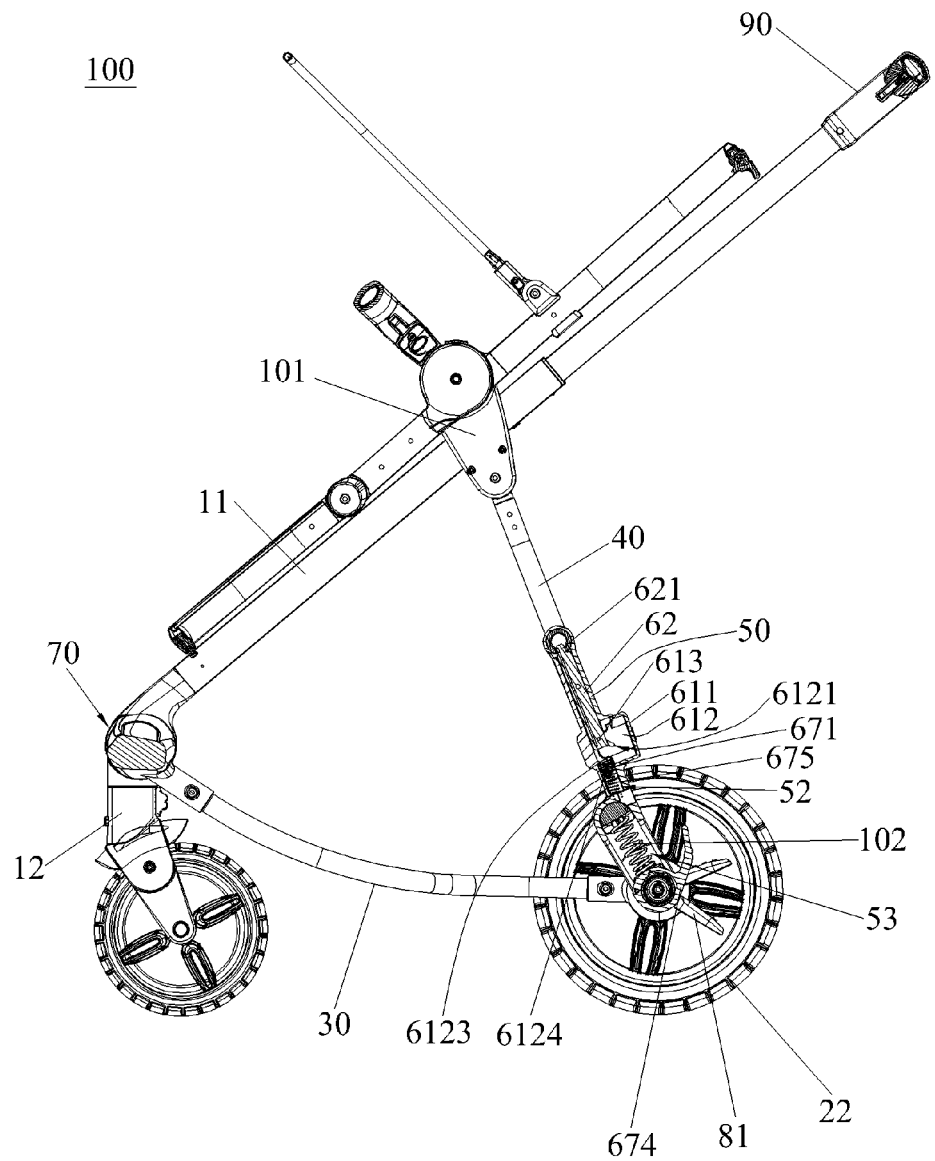
FIG. 15 is a side view illustrating the upper support member and the lower support member shown in FIG. 14 in the lock state.
Figure 16:
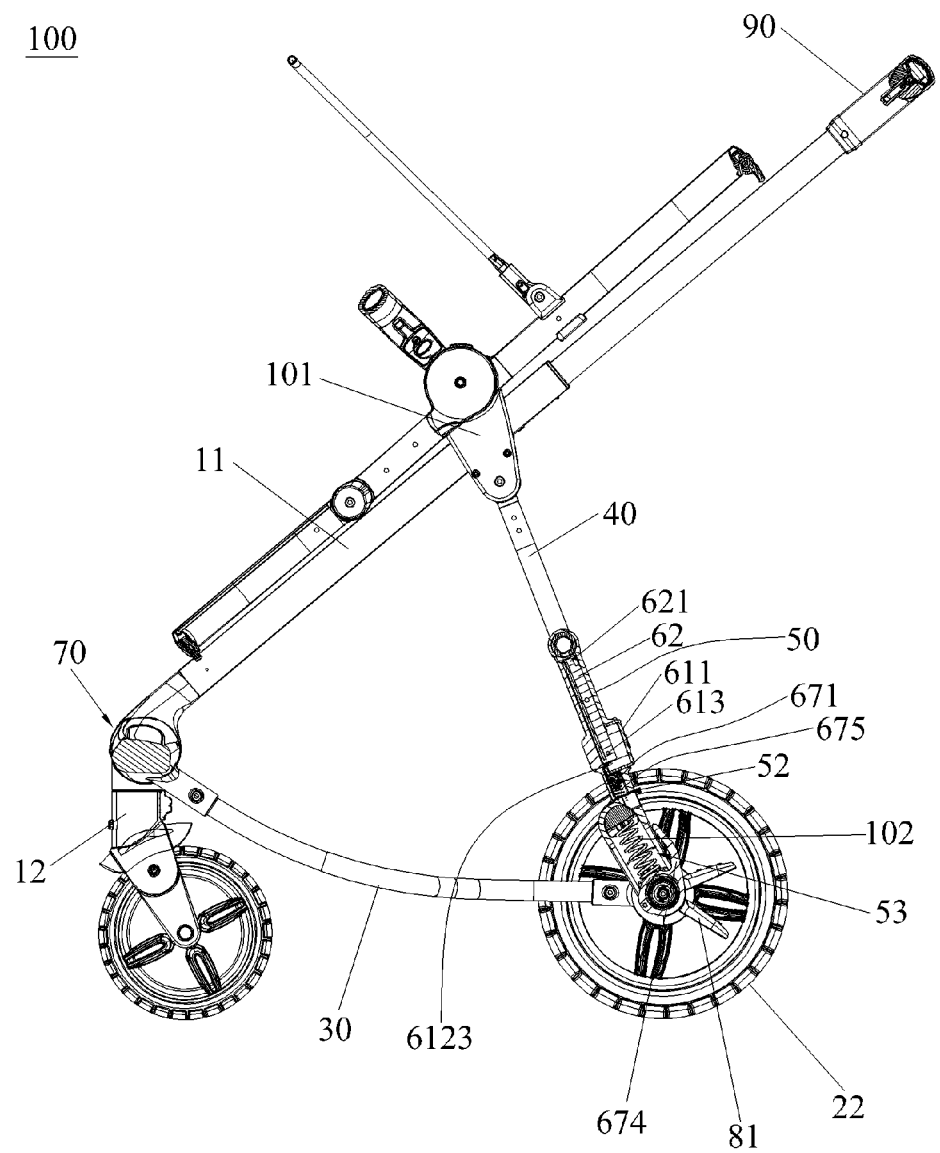
FIG. 16 is a side view illustrating the upper support member and the lower support member shown in FIG. 14 in the unlock state.
Figure 17:
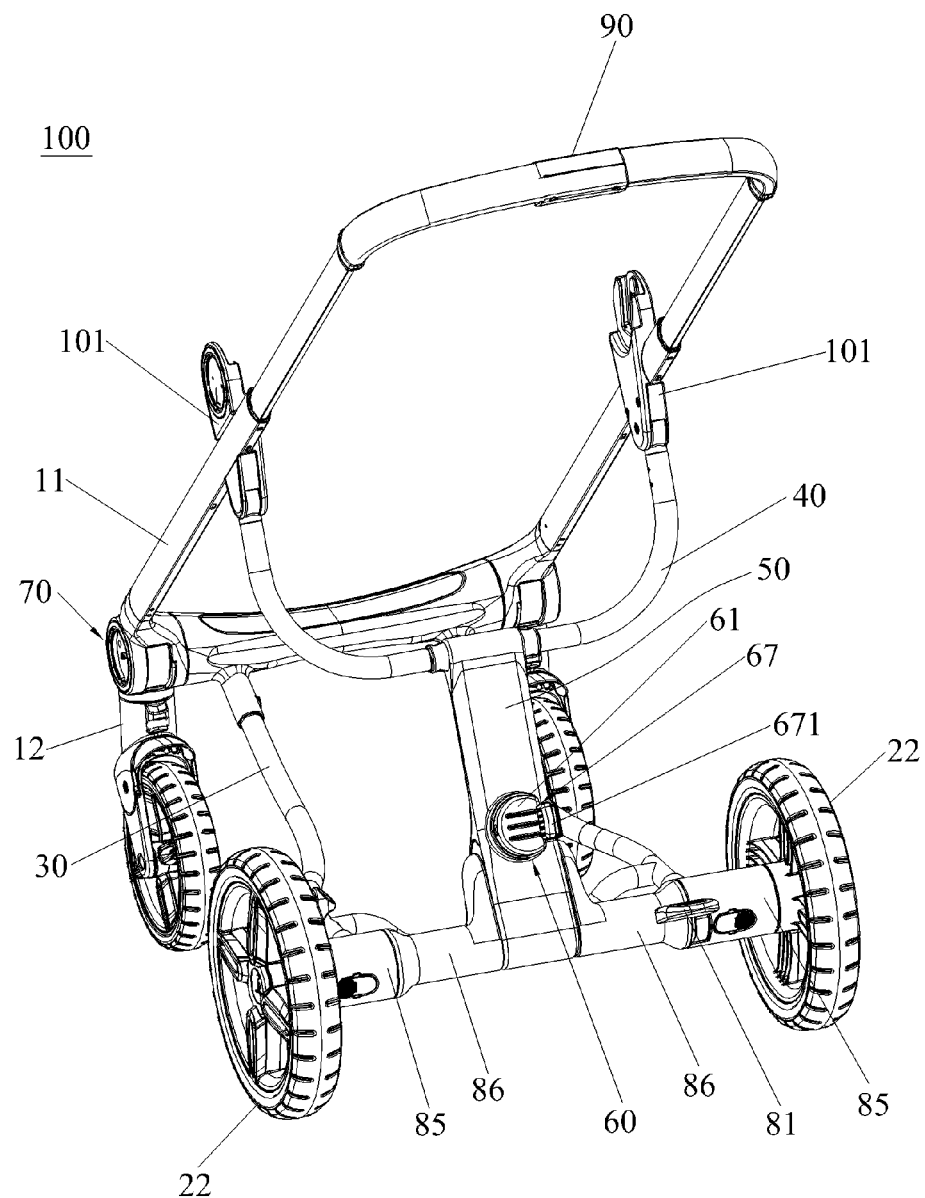
FIG. 17 is a schematic view illustrating the structure of the stroller frame of the third embodiment of the invention.
Figure 18:
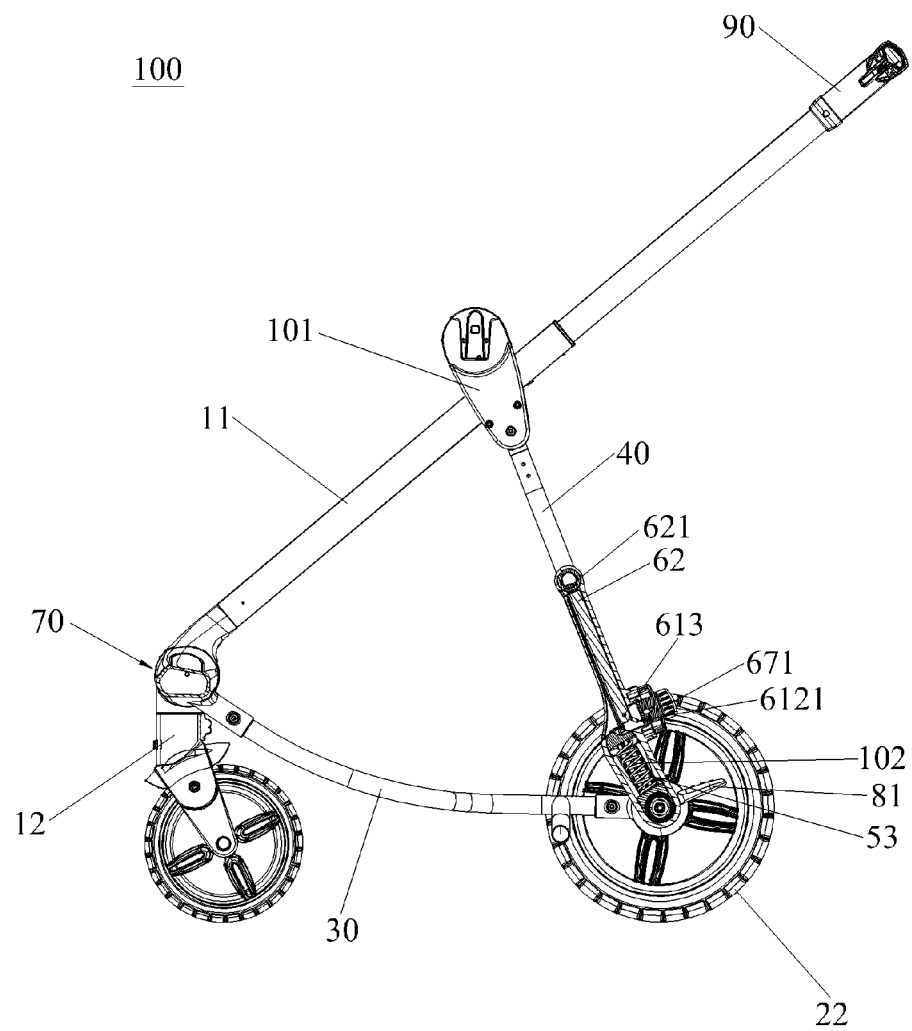
FIG. 18 is a side view illustrating the upper support member and the lower support member shown in FIG. 17 in the lock state.
Figure 19:
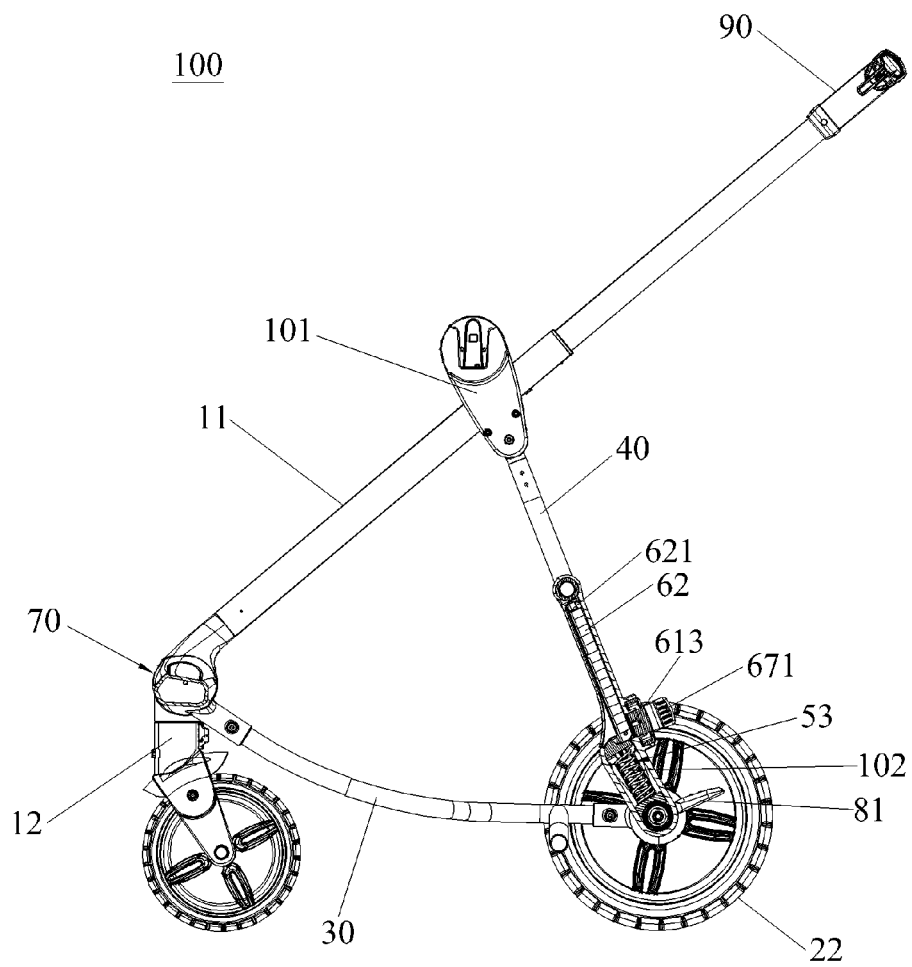
FIG. 19 is a side view illustrating the upper support member and the lower support member shown in FIG. 17 in the unlock state.
Figure 20:
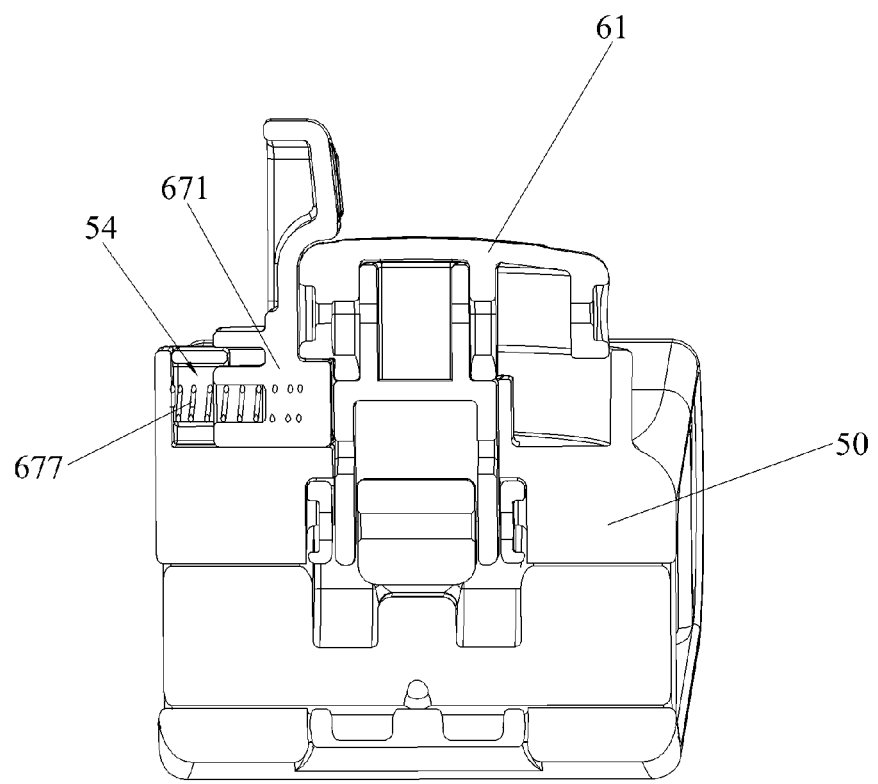
FIG. 20 is a schematic view illustrating the second safety lock and the lower support member of the third embodiment of the invention in the lock state.

As shown in FIGS. 14 to 16, the difference between this embodiment and the first embodiment is the arrangement of the second operating portion 671. The second operating portion 671 of this embodiment is movably connected to the lower support member 50. Preferably, the lower support member 50 has a third sliding groove 52 for the second operating portion 671 to slide therein. When the second operating portion 671 approaches and presses the operating member 61 along the third sliding groove 52, the second operating portion 671 restrains the movement of the operating member 61. When the second operating portion 671 is away from the operating member 61 along the third sliding groove 52, the second operating portion 671 releases the operating member 61.

The second safety lock 67 further includes a lower operating member 674, a third elastic member 675 and a second transmitting portion. The lower operating member 674 is movably connected to the transverse tube 21. The second transmitting portion is connected between the lower operating member 674 and the second operating portion 671. Preferably, the lower operating member 674 is rotatably connected to the transverse tube 21 and the second transmitting portion is a wire. The wire is specifically a steel wire. The wire connects the second operating portion 671 and the lower operating member 674, such that the second operating portion 671 and the lower operating member 674 can be linked by the wire. The lower operating member 674 is operated to drive the second operating portion 671 to unlock the operating member 61 through the second transmitting portion. The third elastic member 675 provides an elastic force for the lower operating member 674 to lock the operating member 61. The third elastic member 675 is disposed in the third sliding groove 52 and contacts the second operating portion 671. The operating member 61 forms a pressing portion 6123 for the second operating portion 671 to press. The third elastic member 675 always biases the second operating portion 671 toward the pressing portion 6123. In this embodiment, the lower operating member 674 is an unlock button. Needless to say, other operating members may also be used as the lower operating member 674, such as pedal, sleeve, wrench, etc.

Furthermore, the second safety lock 67 further includes a sixth elastic member (not shown). The sixth elastic member is connected to the lower operating member 674. The second operating portion 671 and the lower operating member 674 can be linked by a wire. When the lower operating member 674 is operated, the lower operating member 674 drives the wire to drive the second operating portion 671 to slide along the third sliding groove 52. The third elastic member 675 always drives the lower operating member 674 to return to the lock state, such that the second operating portion 671 always restrains the movement of the operating member 61 in a natural state. When the restriction on the operating member 61 by the second operating portion 671 needs to be released, the lower operating member 674 is rotated to pull the second operating portion 671 away from the operating member 61 through the wire. Through the above arrangement, the second operating portion 671 can lock the operating member 61, so as to effectively improve the safety of the stroller frame 100.

Third Embodiment

Figure 21:
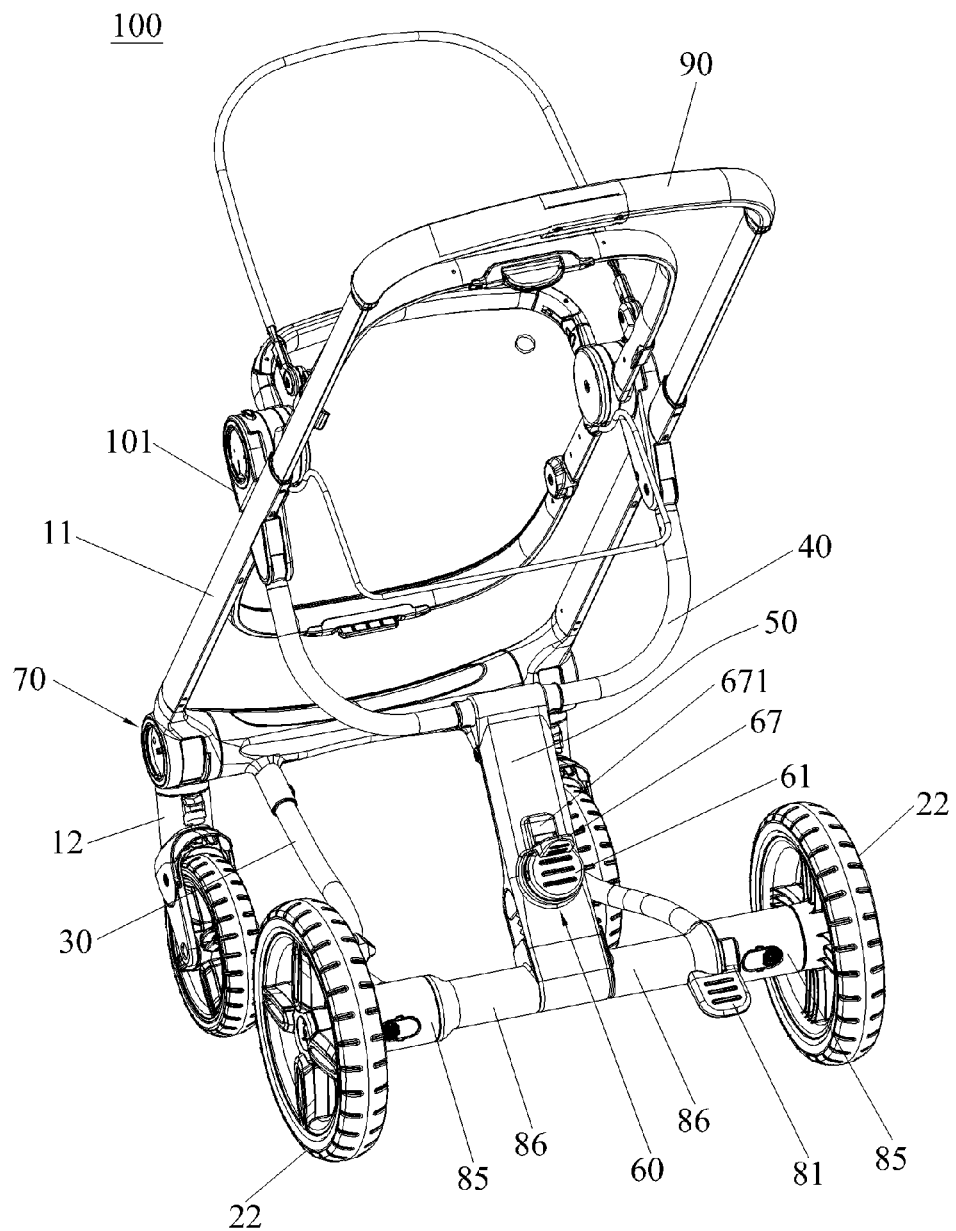
FIG. 21 is a schematic view illustrating another structure of the stroller frame of the third embodiment of the invention.

As shown in FIGS. 17 to 21, the difference between this embodiment and the first embodiment is the arrangement of the second operating portion 671. The second operating portion 671 of this embodiment is slidably connected to the lower support member 50. The second operating portion 671 is disposed at a right side (or left side) of the operating member 61. In another embodiment, the second operating portion 671 is disposed at an upper side (or lower side) of the operating member 61, as shown in FIG. 21. Needless to say, the second operating portion 671 may also be disposed at an inclined side of the operating member 61. The different orientations of the second operating portion 671 disposed on the operating member 61 are determined according to practical applications, so the invention is not limited to a specific manner. The lower support member 50 forms a fifth sliding groove 54 for the second operating portion 671 to slide therein. The second safety lock 67 further includes a seventh elastic member 677. The seventh elastic member 677 is disposed in the fifth sliding groove 54 and connected to the second operating portion 671. The seventh elastic member 677 always biases the second operating portion 671 toward the operating member 61. The second operating portion 671 approaches and presses the operating member 61 along the fifth sliding groove 54 to restrain the movement of the operating member 61. The second operating portion 671 moves away from the operating member 61 along the fifth sliding groove 54 to release the operating member 61. The movement of the second operating portion 671 in the fifth sliding groove 54 is controlled to lock or release the operating member 61.

Specifically, a side of the second operating portion 671 that abuts the operating member 61 protrudes toward the operating member 61 to form a protrusion. The corresponding side of the operating member 61 forms a notch for the protrusion to engage and abut. When the second operating portion 671 approaches the operating member 61 along the fifth sliding groove 54, the protrusion is aligned and sinks into the notch. At this time, the protrusion engages and abuts against the notch to restrain the pressing of the operating member 61, such that the second operating portion 671 restrains the movement of the operating member 61. When the second operating portion 671 moves away from the operating member 61 along the fifth sliding groove 54, the protrusion detaches and separates from the notch, and the protrusion releases abutment on the operating member 61, such that the second operating portion 671 releases the operating member 61.

As shown in FIGS. 1 to 21, the front leg 10, the bottom tube 30, the lower support member 50 and the upper support member 40 of the invention are pivotally connected to each other to form a four-bar linkage structure, and the lock mechanism 60 is disposed at the pivot joint between the upper support member 40 and the lower support member 50, such that the stroller frame 100 can be flexibly folded through the four-bar linkage structure and the lock mechanism 60 can be operated to lock or unlock the upper support member 40 and the lower support member 50, so as to lock the expanded stroller frame 100. Accordingly, the invention can avoid accident caused by accidental folding of the stroller frame 100, and the folded stroller frame 100 has a small size and is easy to carry.

The invention claimed is:

1. A stroller frame (100) comprising:
a front leg (10), a bottom tube (30), a rear leg (20), an upper support member (40), and a lower support member (50), wherein the front leg (10), the bottom tube (30), the lower support member (50), and the upper support member (40) are pivotally connected to each other to form a four-bar linkage structure, and the rear leg (20) is connected to an end of the bottom tube (30) close to the lower support member (50), and
a lock mechanism (60) disposed at a pivot joint between the upper support member (40) and the lower support member (50), the lock mechanism (60) comprising an operating member (61), an engaging member (62), and a fixing member (63) engaging with the engaging member (62), the engaging member (62) is movably disposed on the lower support member (50), the fixing member (63) is disposed on the upper support member (40), and the fixing member (63) corresponds to and engages with the engaging member (62) when the upper support member (40) and the lower support member (50) are situated at the expanded angle, and the operating member (61) is connected to the engaging member (62) and controls the engaging member (62) to be disengaged from the fixing member (63) to unlock the lock mechanism (60);
wherein the lock mechanism (60) is configured to lock the upper support member (40) and the lower support member (50) at an expanded angle, such that the front leg (10) is expandable with respect to the bottom tube (30), and
wherein the lock mechanism (60) is configured to be unlocked to release the upper support member (40) and the lower support member (50), such that the front leg (10) is foldable with respect to the bottom tube (30).

2. The stroller frame (100) of claim 1, wherein the fixing member (63) is an engaging recess disposed on the upper support member (40), and the engaging member (62) comprises an engaging block (621) matching with the engaging recess.

3. The stroller frame (100) of claim 1, wherein the lock mechanism (60) further comprises a first elastic member (64) connected to the engaging member (62) and provides an elastic force for the engaging member (62) to engage with the fixing member (63).

4. The stroller frame (100) of claim 1, wherein the engaging member (62) is slidably connected to the lower support member (50) and slidable with respect to the lower support member (50) to engage with or disengage from the fixing member (63).

5. The stroller frame (100) of claim 4, wherein the lock mechanism (60) further comprises a decorative cover (65) and a first reinforcing member (66),
wherein the lower support member (50) has a first sliding groove (51) for the engaging member (62) to slide therein, and
wherein the decorative cover (65) is disposed on the first sliding groove (51) and covers the first sliding groove (51), the decorative cover (65) encloses the engaging member (62) in the first sliding groove (51), and the first reinforcing member (66) is disposed on the engaging member (62).

6. The stroller frame (100) of claim 1, wherein the operating member (61) comprises:
a first operating portion (611), a first transmitting portion (612) connected to the first operating portion (611), and a sliding block (613),
the first transmitting portion (612) is disposed on the lower support member (50) along a direction perpendicular to a moving direction of the engaging member (62) and has a first inclined groove (6121) inclining with respect to the moving direction of the engaging member (62), and
the sliding block (613) is slidably connected to the first inclined groove (6121) and disposed on the engaging member (62), the first operating portion (611) is operated to drive the first transmitting portion (612) to slide with respect to the lower support member (50), such that the sliding block (613) slides along the first inclined groove (6121) to disengage the engaging member (62) from the fixing member (63).

7. The stroller frame (100) of claim 1, wherein the lock mechanism (60) further comprises a second safety lock (67) that selectively restrains an operation of the operating member (61).

8. The stroller frame (100) of claim 7, wherein the second safety lock (67) comprises a second operating portion (671), wherein:
the second operating portion (671) is movably connected to the operating member (61) or the lower support member (50),
the second operating portion (671) is operated to move to an unlock position and a lock position with respect to the operating member (61),
the second operating portion (671) engages with the operating member (61) or the lower support member (50) at the unlock position to restrain the operation of the operating member (61), and
the second operating portion (671) disengages from the operating member (61) or the lower support member (50) at the lock position to unlock the operating member (61).

9. The stroller frame (100) of claim 8, wherein the second safety lock (67) further comprises a second elastic member (672) that provides an elastic force for the second operating portion (671) to lock the operating member (61).

10. The stroller frame (100) of claim 8, wherein a restraining member (673) is disposed between the second operating portion (671) and the operating member (61) or the lower support member (50), the restraining member (673) enables the second operating portion (671) to move between the unlock position and the lock position with respect to the operating member (61).

11. The stroller frame (100) of claim 8, wherein the rear leg (20) comprises a transverse tube (21) connected to the bottom tube (30), and the lower support member (50) is pivotally connected to the transverse tube (21), such that that the lower support member (50) is pivotally connected to the bottom tube (30) through the transverse tube (21).

12. The stroller frame (100) of claim 11, wherein: the second operating portion (671) is movably connected to the lower support member (50), and the second safety lock (67) further comprises a lower operating member (674), a third elastic member (675), and a second transmitting portion, wherein the lower operating member (674) is movably connected to the transverse tube (21), the second transmitting portion is connected between the lower operating member (674) and the second operating portion (671), the lower operating member (674) is operated to drive the second operating portion (671) to unlock the operating member (61) through the second transmitting portion, and the third elastic member (675) provides an elastic force for the lower operating member (674) to lock the operating member (61).

13. The stroller frame (100) of claim 12, wherein the lower operating member (674) is rotatably connected to the transverse tube (21), and the second transmitting portion is a wire.

14. The stroller frame (100) of claim 8, wherein the second operating portion (671) is slidably connected to the lower support member (50).

15. The stroller frame (100) of claim 14, wherein the second operating portion (671) is disposed at an upper side, a lower side, a left side, or a right side of the operating member (61).

16. The stroller frame (100) of claim 1 wherein the stroller frame (100) further comprises a seat fixing base (101) for installing a seat, the seat fixing base (101) is connected to the front leg (10), the upper support member (40) is pivotally connected to the seat fixing base (101), and the upper support member (40) is pivotally connected to the front leg (10) through the seat fixing base (101).

17. The stroller frame (100) of claim 1 wherein the stroller frame (100) further comprises a fifth elastic member (102) and the rear leg (20) comprises a transverse tube (21), the transverse tube (21) is connected to the bottom tube (30), the lower support member (50) is pivotally connected to the transverse tube (21), such that the lower support member (50) is pivotally connected to the bottom tube (30) through the transverse tube (21), and a fourth sliding groove (53) is formed between the lower support member (50) and the transverse tube (21), the fifth elastic member (102) is disposed in the fourth sliding groove (53) and abuts against the lower support member (50) and the transverse tube (21), and the fifth elastic member (102) buffers vibration of the lower support member (50) and the transverse tube (21).

18. A stroller comprising a seat and the stroller frame (100) of claim 1, the seat being detachably connected to the stroller frame (100).

19. A stroller frame (100) comprising:

a front leg (10), a bottom tube (30), a rear leg (20), an upper support member (40), and a lower support member (50), wherein the front leg (10), the bottom tube (30), the lower support member (50), and the upper support member (40) are pivotally connected to each other to form a four-bar linkage structure, and the rear leg (20) is connected to an end of the bottom tube (30) close to the lower support member (50), and a lock mechanism (60) disposed at a pivot joint between the upper support member (40) and the lower support member (50), wherein the lock mechanism (60) is configured to lock the upper support member (40) and the lower support member (50) at an expanded angle, such that the front leg (10) is expandable with respect to the bottom tube (30), and wherein the lock mechanism (60) is configured to be unlocked to release the upper support member (40) and the lower support member (50), such that the front leg (10) is foldable with respect to the bottom tube (30);

wherein the front leg (10) comprises a front leg rod (11) and a front wheel member (12), the front wheel member (12) is rotatably connected to the front leg rod (11) to form a first pivot point, and the front leg rod (11) is pivotally connected to the bottom tube (30) to form a second pivot point, and a linkage mechanism (70) is disposed between the first pivot point and the second pivot point, such that the linkage mechanism (70) drives the front wheel member (12) to be folded with respect to the front leg rod (11) when the front leg rod (11) is folded with respect to the bottom tube (30).

20. The stroller frame (100) of claim 19, wherein the linkage mechanism (70) comprises a first gear plate (71) disposed on the front leg rod (11), a second gear plate (72) disposed on the front wheel member (12), and a synchromesh gear (73) disposed on the bottom tube (30), the synchromesh gear (73) meshes with teeth of the first gear plate (71) and teeth of the second gear plate (72) synchronously.

21. The stroller frame (100) of claim 19, wherein the linkage mechanism (70) comprises a first gear plate (71) disposed on the bottom tube (30), a second gear plate (72) disposed on the front wheel member (12), and a synchromesh gear (73) disposed on the front leg rod (11), the synchromesh gear (73) meshes with teeth of the first gear plate (71) and teeth of the second gear plate (72) synchronously.

22. The stroller frame (100) of claim 19, wherein the stroller frame (100) further comprises a brake mechanism (80), wherein the rear leg (20) comprises a transverse tube (21) and a rear wheel (22), opposite ends of the transverse tube (21) are equipped with the rear wheel (22), the brake mechanism (80) is disposed on the transverse tube (21), and the brake mechanism (80) is operated to brake the rear wheel (22).

23. The stroller frame (100) of claim 22, wherein the brake mechanism (80) comprises a brake pedal (81) and a brake pin (82), a circumference of the rear wheel (22) has a plurality of brake holes (221) for receiving the brake pin (82), the brake pedal (81) is movably disposed on the transverse tube (21) and able to drive the brake pin (82) to be inserted into one of the brake holes (221) to brake the rear wheel (22).

24. The stroller frame (100) of claim 23, wherein the brake mechanism (80) further comprises a fourth elastic member (87) that provides an elastic force for ejecting the brake pin (82) out of the brake hole (221).

25. The stroller frame (100) of claim 23, wherein the brake mechanism (80) further comprises a driving member (83) sleeved on the transverse tube (21) and rotatable around an axle center of the transverse tube (21), wherein the brake pedal (81) is movably disposed on the transverse tube (21) and drives the driving member (83) to rotate, a side of the driving member (83) has an inclined wall (8312) opposite to the brake pin (82), the inclined wall (8312) is inclined along a rotating direction of the driving member (83), and the brake pin (82) is slidably connected to the transverse tube (21) and abuts against the inclined wall (8312).

26. A stroller frame (100) comprising:

a front leg (10), a bottom tube (30), a rear leg (20), an upper support member (40), and a lower support member (50), wherein the front leg (10), the bottom tube (30), the lower support member (50), and the upper support member (40) are pivotally connected to each other to form a four-bar linkage structure, and the rear leg (20) is connected to an end of the bottom tube (30) close to the lower support member (50), a lock mechanism (60) disposed at a pivot joint between the upper support member (40) and the lower support member (50), wherein the lock mechanism (60) is configured to lock the upper support member (40) and the lower support member (50) at an expanded angle, such that the front leg (10) is expandable with respect to the bottom tube (30), and wherein the lock mechanism (60) is configured to be unlocked to release the upper support member (40) and the lower support member (50), such that the front leg (10) is foldable with respect to the bottom tube (30); and a handle (90) telescopically connected to an end of the front leg (10) connected to the upper support member (40), wherein the rear leg (20) has a folding hook (852) for engaging with the handle (90), such that the handle (90) engages with the folding hook (852) when the handle (90) retracts into the front leg (10) and the front leg (10) is folded with respect to the bottom tube (30).

\* \* \* \* \*